US012505814B2

(12) United States Patent
Wang et al.

(10) Patent No.: US 12,505,814 B2
(45) Date of Patent: Dec. 23, 2025

(54) ARRAY SUBSTRATE, SHIFT REGISTER UNIT AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Yang Wang, Beijing (CN); Yi Liu, Beijing (CN); Gongda Chen, Beijing (CN); Jiantao Liu, Beijing (CN); Haiyao Liang, Beijing (CN); Shijun Wang, Beijing (CN); Zhan Wei, Beijing (CN); Tengfei Ding, Beijing (CN); Shengfeng Zhang, Beijing (CN); Xinlan Yang, Beijing (CN); Shengmei Qi, Beijing (CN); Yuke Tai, Beijing (CN); Jiguo Wang, Beijing (CN); Zhou Peng, Beijing (CN); Zhangjie Qiu, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 74 days.

(21) Appl. No.: 18/701,400

(22) PCT Filed: Mar. 29, 2023

(86) PCT No.: PCT/CN2023/084730
§ 371 (c)(1),
(2) Date: Apr. 15, 2024

(87) PCT Pub. No.: WO2024/197647
PCT Pub. Date: Oct. 3, 2024

(65) Prior Publication Data

US 2025/0246164 A1 Jul. 31, 2025

(51) Int. Cl.
*G09G 3/36* (2006.01)

(52) U.S. Cl.
CPC ......... *G09G 3/3607* (2013.01); *G09G 3/3655* (2013.01); *G09G 3/3677* (2013.01);
(Continued)

(58) Field of Classification Search
CPC .............................. G09G 3/3655; G02F 1/133
See application file for complete search history.

(56) References Cited

U.S. PATENT DOCUMENTS 10,741,132 B2 8/2020 Chen et al.

FOREIGN PATENT DOCUMENTS

CN 101211074 A 7/2008
CN 106531117 B 3/2017
(Continued)

OTHER PUBLICATIONS

International Search Report in PCT/CN2023/084730 in Chinese dated Dec. 26, 2023.

*Primary Examiner* — Gustavo Polo
(74) *Attorney, Agent, or Firm* — Collard & Roe, P.C.

(57) ABSTRACT

An array substrate, a shift register unit and a display apparatus are provided. The array substrate includes data lines, gate lines, first control signal lines and sub-pixels. The sub-pixel includes a first sub-pixel portion including a first pixel electrode and a first transistor, and a second sub-pixel portion including a second pixel electrode, a second transistor and a third transistor; the first transistor is connected with the first pixel electrode the second transistor and the third transistor are connected with the second pixel electrode, the first transistor and the second transistor are connected with a same gate line and a same data line, and the third transistor is connected with the first control signal line. The second sub-pixel portion includes an adjustable capaci-
(Continued)

tor connecting with the third transistor, and the array substrate further includes a second control signal line connected with the adjustable capacitor.

20 Claims, 9 Drawing Sheets

(52) U.S. Cl.
CPC ............... *G09G 2300/0426* (2013.01); *G09G 2300/0452* (2013.01); *G09G 2300/0465* (2013.01); *G09G 2300/0852* (2013.01); *G09G 2310/0286* (2013.01); *G09G 2320/0233* (2013.01); *G09G 2320/0242* (2013.01); *G09G 2320/0666* (2013.01); *G09G 2340/0435* (2013.01)

(56) References Cited

FOREIGN PATENT DOCUMENTS

| | | | | | |
|---|---|---|---|---|---|
| CN | 107153310 | A | | 9/2017 | |
| CN | 108563080 | A | * | 4/2018 | ............. G02F 1/133 |
| CN | 110196653 | A | | 9/2019 | |
| CN | 112748614 | A | | 5/2021 | |
| CN | 115035862 | A | | 9/2022 | |

* cited by examiner

ARRAY SUBSTRATE, SHIFT REGISTER UNIT AND DISPLAY APPARATUS

CROSS REFERENCE TO RELATED APPLICATIONS

This application is the National Stage of PCT/CN2023/084730 filed on Mar. 29, 2023, the disclosure of which is incorporated by reference.

TECHNICAL FIELD

Embodiments of the present disclosure relate to an array substrate, a shift register unit and a display apparatus.

BACKGROUND

Currently, a liquid crystal display is a widely used display product, which includes two substrates which are stacked and a liquid crystal layer located between the two substrates. With the development of technology, people have increasing requirements for display functions or effects of liquid crystal display apparatuses, for example, compatibility with high and low refresh rates, low-temperature startup capability, and large-angle display effect.

SUMMARY

Embodiments of the present disclosure provide an array substrate, a shift register unit and a display apparatus.

An embodiment of the present disclosure provides an array substrate, which includes: a base substrate; a plurality of sub-pixels, located on the base substrate, the plurality of sub-pixels being arranged in an array along a first direction and a second direction, and the first direction intersecting with the second direction; a plurality of data lines, located on the base substrate and arranged along the first direction; a plurality of gate lines, located on the base substrate and arranged along the second direction; a plurality of first control signal lines, located on the base substrate and arranged along the second direction. Each sub-pixel among at least some sub-pixels includes a first sub-pixel portion and a second sub-pixel portion arranged along the second direction; the first sub-pixel portion includes a first pixel electrode; the second sub-pixel portion includes a second pixel electrode; the first pixel electrode and the second pixel electrode are spaced apart from each other; and the first sub-pixel portion and the second sub-pixel portion share a common electrode; the first sub-pixel portion includes a first transistor; a first electrode of the first transistor is connected with the first pixel electrode; the second sub-pixel portion includes a second transistor and a third transistor; a first electrode of the second transistor and a first electrode of the third transistor are both connected with the second pixel electrode; a control electrode of the first transistor and a control electrode of the second transistor are both connected with a same gate line; a second electrode of the first transistor and a second electrode of the second transistor are both connected with a same data line; and a control electrode of the third transistor is connected with the first control signal line. The array substrate further includes a second control signal line; the second sub-pixel portion further includes an adjustable capacitor; a first electrode of the adjustable capacitor is connected with the second electrode of the third transistor; and the second control signal line is connected with a second electrode of the adjustable capacitor to apply a voltage to change a capacitance value of the adjustable capacitor; a semiconductor layer and an insulation layer are arranged between the first electrode of the adjustable capacitor and the second electrode of the adjustable capacitor; the semiconductor layer, an active layer of the first transistor, an active layer of the second transistor, and an active layer of the third transistor are all arranged in a same layer; a first protruding portion is provided on a side of the second pixel electrode that is close to the first pixel electrode; a second protruding portion is provided on a side of the second electrode of the adjustable capacitor that is close to the second pixel electrode; and the first control signal line includes a bent portion located between the first protruding portion and the second protruding portion.

For example, according to an embodiment of the present disclosure, the active layer of the first transistor, the active layer of the second transistor, the active layer of the third transistor, as well as the first electrode and the second electrode of the adjustable capacitor are all located between the first pixel electrode and the second pixel electrode.

For example, according to an embodiment of the present disclosure, the same gate line electrically connected with the control electrode of the first transistor and the control electrode of the second transistor is located between the first pixel electrode and the second pixel electrode.

For example, according to an embodiment of the present disclosure, the first control signal line is located between the first pixel electrode and the second pixel electrode.

For example, according to an embodiment of the present disclosure, the second control signal line is located between the same gate line and the first control signal line.

For example, according to an embodiment of the present disclosure, the plurality of gate lines is located between the plurality of data lines and the base substrate; the second electrode of the adjustable capacitor, and the control electrodes of respective transistors are all arranged in the same layer as the plurality of gate lines; and the first electrode of the adjustable capacitor is arranged in the same layer as the plurality of data lines.

For example, according to an embodiment of the present disclosure, a straight line extending along the second direction passes through the active layer of the second transistor and the semiconductor layer of the adjustable capacitor.

For example, according to an embodiment of the present disclosure, a straight line extending along the first direction passes through the control electrode of the third transistor and the second electrode of the adjustable capacitor.

For example, according to an embodiment of the present disclosure, the first electrode of the second transistor and the first electrode of the third transistor are an integrated structure; and the first electrode of the third transistor is arranged in the same layer as the plurality of data lines.

For example, according to an embodiment of the present disclosure, the second electrode of the third transistor and the first electrode of the adjustable capacitor are an integrated structure; and the second electrode of the third transistor is located between at least a portion of the first electrode of the second transistor and the second pixel electrode.

For example, according to an embodiment of the present disclosure, the plurality of sub-pixels is arranged into a plurality of rows and columns of sub-pixels; the plurality of rows of sub-pixels is arranged along the second direction; second electrodes of adjustable capacitors in each row of sub-pixels are connected with a same second control signal line; and a plurality of second control signal lines connected with adjustable capacitors of the plurality of rows of sub-pixels is arranged along the second direction.

For example, according to an embodiment of the present disclosure, the array substrate further including: at least one third control signal line and at least one pin electrically connected with the at least one third control signal line. An extension direction of the at least one third control signal line is the same as an extension direction of the data line; and the plurality of second control signal lines is connected with the at least one third control signal line.

For example, according to an embodiment of the present disclosure, the array substrate according to claim 11, further including a plurality of pins, wherein each second control signal line is connected with one pin such that each second control signal line is configured to separately input a control signal.

An embodiment of the present disclosure provides an array substrate, which includes: a base substrate; a plurality of sub-pixels, located on the base substrate; the plurality of sub-pixels being arranged in an array along a first direction and a second direction; and the first direction intersecting with the second direction; a plurality of data lines, located on the base substrate and arranged along the first direction; a plurality of gate lines, located on the base substrate and arranged along the second direction. Respective sub-pixels each include a transistor as well as a pixel electrode and a common electrode stacked; a first electrode of the transistor is connected with the data line; a second electrode of the transistor is connected with the pixel electrode; and a control electrode of the transistor is connected with the gate line; the array substrate further includes at least one control signal line; and at least some sub-pixels each further include an adjustable capacitor; the adjustable capacitor includes a first electrode, a semiconductor layer, and a second electrode sequentially stacked in a direction perpendicular to the base substrate; the semiconductor layer is arranged in the same layer as and spaced apart from an active layer of the transistor; the first electrode of the adjustable capacitor is connected with the pixel electrode; the control signal line is connected with the second electrode of the adjustable capacitor to apply a voltage to change a capacitance value of the adjustable capacitor; and a straight line extending along the first direction passes through the active layer and the semiconductor layer.

For example, according to an embodiment of the present disclosure, at least one gate line is also used as the control signal line.

For example, according to an embodiment of the present disclosure, the gate line is spaced apart from the control signal line; and the second electrode of the adjustable capacitor is completely located between the control signal line and the pixel electrode connected with the first electrode of the adjustable capacitor.

For example, according to an embodiment of the present disclosure, the control electrode of the transistor is arranged in the same layer as the gate line; the control electrode includes two portions located on both sides of the gate line; one of the two portions that is close to the adjustable capacitor has a first size in the second direction; the other of the two portions that is away from the adjustable capacitor has a second size in the second direction; and the first size is greater than the second size.

For example, according to an embodiment of the present disclosure, the second electrode of the transistor is spaced apart from the first electrode of the adjustable capacitor.

For example, according to an embodiment of the present disclosure, the control signal line is arranged in the same layer as the gate line; the plurality of sub-pixels is arranged into a plurality of rows and columns of sub-pixels; the plurality of rows of sub-pixels is arranged along the second direction; second electrodes of adjustable capacitors in each row of sub-pixels are connected with a same control signal line; and a plurality of control signal lines connected with adjustable capacitors of the plurality of rows of sub-pixels is arranged along the second direction.

For example, according to an embodiment of the present disclosure, the array substrate further includes: at least one control signal connection line and at least one pin electrically connected with the at least one control signal connection line. An extension direction of the at least one control signal connection line is the same as an extension direction of the data line; and the plurality of control signal lines is connected with the at least one control signal connection line.

For example, according to an embodiment of the present disclosure, the array substrate further includes a plurality of pins, each control signal line is connected with one pin such that each control signal line is configured separately input a control signal.

For example, according to an embodiment of the present disclosure, the array substrate further includes: a plurality of rows of shift register units, located on the base substrate. The shift register unit includes an input circuit, an output circuit, and a node denoising circuit; the input circuit is connected with a first node, and is configured to supply an input signal to the first node; the node denoising circuit is connected with the first node and a second node, and is configured to denoise the first node under control of a level of the second node; the output circuit is connected with the first node and an output end, and is configured to output an output signal at the output end under control of a level of the first node, each control signal line is connected with the second node of the shift register unit located in a same row as the control signal line.

An embodiment of the present disclosure provides a shift register unit, which includes an input circuit, an output circuit, and a reset circuit. The input circuit is connected with a first node, and is configured to supply an input signal to the first node; the reset circuit is connected with the first node and a reset end, and is configured to reset the first node in response to a reset signal supplied by the reset end; the output circuit is connected with the first node and an output end, and is configured to output an output signal at the output end under control of the level of the first node. The output circuit includes an adjustable capacitor; a first electrode of the adjustable capacitor is connected with the output end; the first node is connected with a second electrode of the adjustable capacitor to change a capacitance value of the adjustable capacitor when a voltage of the first node changes; the output circuit includes a transistor electrically connected with the adjustable capacitor; a control electrode of the transistor is connected with the first node; one electrode of the transistor is connected with the second electrode of the adjustable capacitor; a semiconductor layer and an insulation layer are arranged between the first electrode of the adjustable capacitor and the second electrode of the adjustable capacitor; and an active layer of the transistor is arranged in the same layer as the semiconductor layer of the adjustable capacitor.

For example, according to an embodiment of the present disclosure, the input circuit includes a first transistor; a first electrode of the first transistor is connected with a first power supply end; a second electrode of the first transistor is connected with the first node; and a gate electrode of the first transistor is connected with a first signal control end; the reset circuit includes a second transistor; a first electrode of the second transistor is connected with the first node; a second electrode of the second transistor is connected with a second power supply end; and a gate electrode of the second transistor is connected with a second signal control end; the output circuit further includes a third transistor; a first electrode of the third transistor is connected with a clock signal end; a second electrode of the third transistor is connected with the first electrode of the adjustable capacitor; and a gate electrode of the third transistor is connected with the first node; the shift register unit further includes a fourth transistor, a fifth transistor, a sixth transistor, a seventh transistor, an eighth transistor, a ninth transistor, a tenth transistor, and an eleventh transistor; a first electrode of the fourth transistor is connected with the first node, a second electrode of the fourth transistor is connected with a third voltage end, a gate electrode of the fourth transistor is connected with a frame reset signal end; a first electrode of the fifth transistor is connected with a fourth voltage end, a second electrode of the fifth transistor is connected with the second node; a first electrode of the sixth transistor is connected with the second node, a second electrode of the sixth transistor is connected with a third voltage end, a gate electrode of the sixth transistor is connected with the first node; a first electrode of the seventh transistor is connected with the first node, a second electrode of the seventh transistor is connected with the third voltage end, a gate electrode of the seventh transistor is connected with the frame reset signal end; a first electrode of the eighth transistor is connected with a gate electrode of the fifth transistor, a second electrode of the eighth transistor is connected with the third voltage end, a gate electrode of the eighth transistor is connected with the first node; a first electrode of the ninth transistor is connected with the fourth voltage end, a second electrode of the ninth transistor is connected with the first electrode of the eighth transistor, a gate electrode of the ninth transistor is connected with the fourth voltage end; a first electrode of the tenth transistor is connected with the first node, a second electrode of the tenth transistor is connected with the third signal end, a gate electrode of the tenth transistor is connected with the second node; a first electrode of the eleventh transistor is connected with the second electrode of the third transistor, a second electrode of the eleventh transistor is connected with the third voltage end, and a gate electrode of the eleventh transistor is connected with the first node.

An embodiment of the present disclosure provides a display apparatus, which includes any array substrate or any shift register unit as mentioned above.

BRIEF DESCRIPTION OF DRAWINGS

In order to clearly illustrate the technical solution of the embodiments of the present disclosure, the drawings of the embodiments will be briefly described in the following; it is obvious that the described drawings are only related to some examples of the present disclosure and thus are not limitative of the present disclosure.

DETAILED DESCRIPTION

Figure 1:
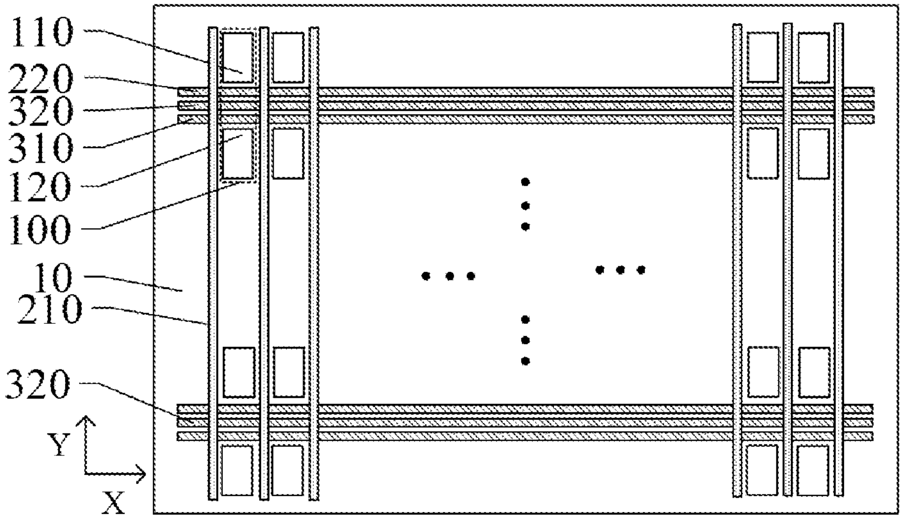
FIG. 1 is a schematic diagram of a partial planar structure of an array substrate provided by an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The features "parallel", "perpendicular" and "same" used in the embodiments of the present disclosure all include features such as "parallel", "perpendicular" and "same" in the strict sense, and the cases having certain errors, such as "approximately parallel", "approximately perpendicular", "substantially the same" or the like, taking into account measurements and errors associated with the measurement of a particular quantity (e.g., limitations of the measurement system), and indicate being within an acceptable range of deviation for a particular value as determined by one of ordinary skill in the art. For example, "approximately" may indicate being within one or more standard deviations, or within 10% or 5% of the stated value. In the case that the quantity of a component is not specifically indicated below in the embodiments of the present disclosure, it means that the component may be one or more, or may be understood as at least one. "At least one" means one or more, and "plurality" means at least two. The "same layer" mentioned in this disclosure refers to the structure formed by two (or more) structures formed by the same deposition process and patterned by the same patterning process, and their materials may be the same or different. The term "integrated structure" in the present disclosure means that two (or more) structures are formed by the same deposition process and patterned by the same patterning process, so as to be connected with each other, and their materials may be the same or different.

In research, the inventors of the present application have found that: a display effect of a display apparatus is limited by a capacitor in a panel, for example, a fixed pixel storage capacitor makes it difficult for a display panel to be compatible with high and low refresh rates; or a small capacitor in a shift register unit in the display apparatus may result in a boost node, for example, failure to keep a PU point voltage which causes poor display; and an excessively large capacitor in the shift register unit may lead to difficulties in charging and discharging of a boost node, and poor low-temperature startup capability.

An embodiment of the present disclosure provides an array substrate, including a base substrate, as well as a plurality of data lines, a plurality of gate lines, and a plurality of first control signal lines located on the base substrate. A plurality of sub-pixels is arranged in an array along a first direction and a second direction; the first direction and the second direction intersect with each other; the plurality of data lines is arranged along the first direction; the plurality of gate lines is arranged along the second direction; and the plurality of first control signal lines is arranged along the second direction. Each sub-pixel among at least some sub-pixels includes a first sub-pixel portion and a second sub-pixel portion arranged along the second direction; the first sub-pixel portion includes a first pixel electrode, the second sub-pixel portion includes a second pixel electrode, the first pixel electrode and the second pixel electrode are spaced apart, and the first sub-pixel portion and the second sub-pixel portion share a common electrode; the first sub-pixel portion includes a first transistor, a first electrode of the first transistor is connected with the first pixel electrode, the second sub-pixel portion includes a second transistor and a third transistor, a first electrode of the second transistor and a first electrode of the third transistor are both connected with the second pixel electrode, a control electrode of the first transistor and a control electrode of the second transistor are both connected with a same gate line, a second electrode of the first transistor and a second electrode of the second transistor are both connected with a same data line, and a control electrode of the third transistor is connected with a first control signal line. The array substrate further includes a second control signal line, the second sub-pixel portion further includes an adjustable capacitor, a first electrode of the adjustable capacitor is connected with a second electrode of the third transistor, and the second control signal line is connected with a second electrode of the adjustable capacitor to apply a voltage to change a capacitance value of the adjustable capacitor; a semiconductor layer and an insulation layer are arranged between the first electrode of the adjustable capacitor and the second electrode of the adjustable capacitor; and the semiconductor layer, an active layer of the first transistor, an active layer of the second transistor, and an active layer of the third transistor are all arranged in a same layer; a first protruding portion is provided on a side of the second pixel electrode that is close to the first pixel electrode; a second protruding portion is provided on a side of the second electrode of the adjustable capacitor that is close to the second pixel electrode; and the first control signal line includes a bent portion located between the first protruding portion and the second protruding portion. In the array substrate provided by the present disclosure, the second sub-pixel portion is provided therein with the adjustable capacitor, both the adjustable capacitor and the second pixel electrode are each provided with a protruding portion, and the first control signal line includes a bent portion located between two protruding portions, which is favorable for maximizing the storage capacitor of the first sub-pixel portion and an adjustable capacitance value range of the adjustable capacitor while alleviating color cast under a large viewing angle, and avoids interference of the first control signal line on the storage capacitor and the adjustable capacitor.

An embodiment of the present disclosure further provides an array substrate, including a base substrate, as well as a plurality of gate lines and a plurality of data lines located on the base substrate. A plurality of sub-pixels is arranged in an array along a first direction and a second direction, and the first direction and the second direction intersect with each other; the plurality of data lines is arranged along the first direction; and the plurality of gate lines is arranged along the second direction. Respective sub-pixels each include a transistor as well as a pixel electrode and a common electrode stacked; a first electrode of the transistor is connected with the data line; a second electrode of the transistor is connected with the pixel electrode; and a control electrode of the transistor is connected with the gate line. The array substrate further includes at least one control signal line; at least some sub-pixels each further include an adjustable capacitor; the adjustable capacitor includes a first electrode, a semiconductor layer, and a second electrode sequentially stacked in a direction perpendicular to the base substrate; the semiconductor layer is arranged in the same layer as and spaced apart from an active layer of the transistor; the first electrode of the adjustable capacitor is connected with the pixel electrode; the control signal line is connected with the second electrode of the adjustable capacitor to apply a voltage to change a capacitance value of the adjustable capacitor; and a straight line extending along the first direction passes through the active layer and the semiconductor layer. In the array substrate provided by the present disclosure, the adjustable capacitor is provided in the sub-pixel, and a positional relationship between the active layer of the transistor and the semiconductor layer of the adjustable capacitor is set, which maximizes an aperture ratio of a sub-pixel by setting the position of the adjustable capacitor, while implementing compatibility with high and low refresh rates.

An embodiment of the present disclosure further provides a shift register unit, including an input circuit, an output circuit, and a reset circuit. The input circuit is connected with a first node, and is configured to supply an input signal to the first node; the reset circuit is connected with the first node and a reset end, and is configured to reset the first node in response to a reset signal supplied by the reset end; and the output circuit is connected with the first node and an output end, and is configured to output an output signal at the output end under control of a level of the first node. The output circuit includes an adjustable capacitor; and the first node is connected with a second electrode of the adjustable capacitor to change a capacitance value of the adjustable capacitor when a voltage of the first node changes. The output circuit includes a transistor electrically connected with the adjustable capacitor; a control electrode of the transistor is connected with the first node; one electrode of the transistor is connected with the second electrode of the adjustable capacitor; a semiconductor layer and an insulation layer are arranged between the first electrode of the adjustable capacitor and the second electrode of the adjustable capacitor; and an active layer of the transistor is arranged in the same layer as the semiconductor layer of the adjustable capacitor. In the shift register unit provided by the present disclosure, the adjustable capacitor is provided so that the capacitance value of the adjustable capacitor increases as the voltage of the first node is boosted, for example, the voltage of the first node is rapidly boosted to improve low-temperature startup capability, and the capacitance value of the adjustable capacitor increases after the voltage of the first node is boosted; when the shift register unit is applied to a touch display apparatus, the voltage at the first node may be better kept in a touch stage; and the capacitance value of the adjustable capacitor decreases as the first node discharges, allowing the first node to discharge rapidly.

Hereinafter, the array substrate, the shift register unit, and the display apparatus provided by the present disclosure will be described in conjunction with the accompanying drawings.

Figure 2:
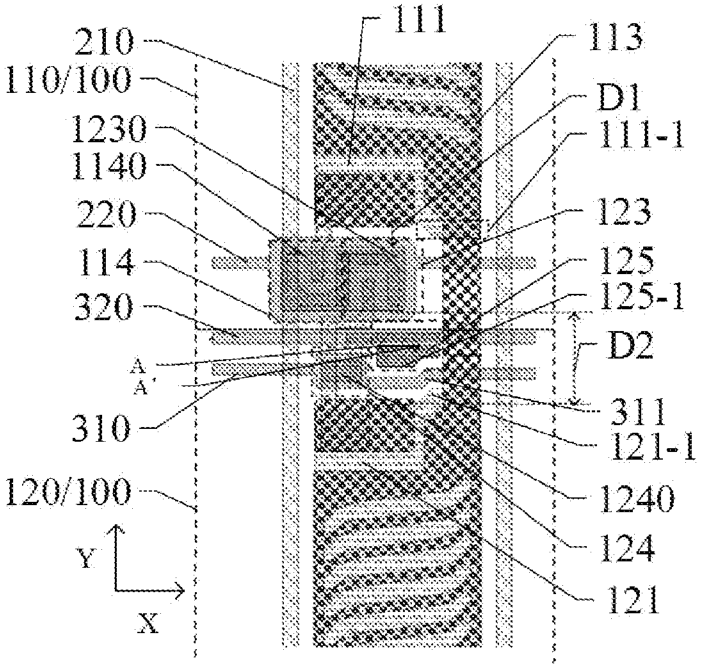
FIG. 2 is a schematic diagram of a partial structure of one sub-pixel in the array substrate shown in FIG. 1 and a connection relationship between the sub-pixel and a signal line.
Figure 3:
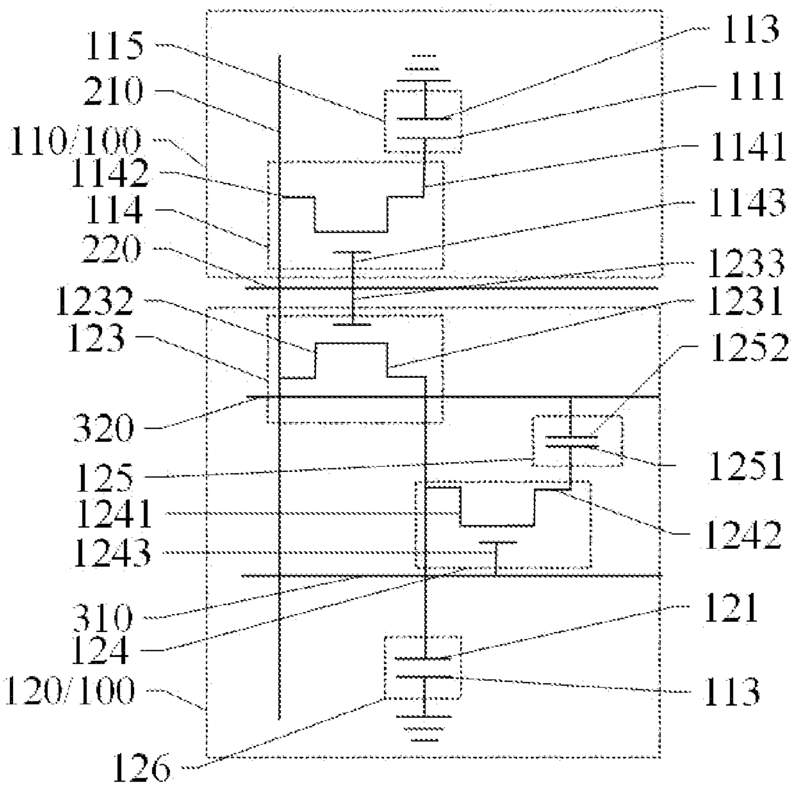
FIG. 3 is a schematic diagram of a circuit structure of the sub-pixel shown in FIG. 2.
Figure 4:
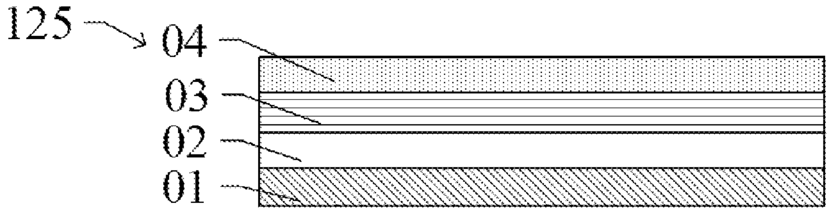
FIG. 4 is a schematic diagram of a cross-sectional structure of an adjustable capacitor sectioned by the line AA' shown in FIG. 2.

FIG. 1 is a schematic diagram of a partial planar structure of an array substrate provided by an embodiment of the present disclosure. FIG. 2 is a schematic diagram of a partial structure of one sub-pixel in the array substrate shown in FIG. 1 and a connection relationship between the sub-pixel and a signal line. FIG. 3 is a schematic diagram of a circuit structure of the sub-pixel shown in FIG. 2. FIG. 4 is a schematic diagram of a cross-sectional structure of an adjustable capacitor sectioned by the line AA' shown in FIG. 2.

As shown in FIG. 1 to FIG. 3, the array substrate includes a base substrate 10, as well as a plurality of sub-pixels 100, a plurality of data lines 210, a plurality of gate lines 220, and a plurality of first control signal lines 310 located on the base substrate 10. The plurality of sub-pixels 100 is arranged in an array along a first direction and a second direction; and the first direction and the second direction intersect with each other. For example, FIG. 1 schematically shows that the first direction is an X direction and the second direction is a Y direction, but it is not limited thereto, and the first direction and the second direction may be interchanged. For example, the first direction is perpendicular to the second direction. But it is not limited thereto, and an included angle between the first direction and the second direction may be 80 degrees to 100 degrees, for example, 85 degrees to 95 degrees, etc. For example, a region where the plurality of sub-pixels 100 is located is a display region for displaying images, for example, the array substrate further includes a peripheral region surrounding the display region.

As shown in FIG. 1 to FIG. 3, the plurality of data lines 210 is arranged along the first direction; the plurality of gate lines 220 is arranged along the second direction; and the plurality of first control signal lines 310 is arranged along the second direction. For example, the plurality of data lines 210 and the plurality of gate lines 220 intersect with each other. For example, the gate line 220 is located between the data line 210 and the base substrate 10.

As shown in FIG. 1 to FIG. 3, each sub-pixel 100 among at least some sub-pixels 100 includes a first sub-pixel portion 110 and a second sub-pixel portion 120 arranged along the second direction; the first sub-pixel portion 110 includes a first pixel electrode 111, the second sub-pixel portion 120 includes a second pixel electrode 121; the first pixel electrode 111 and the second pixel electrode 121 are spaced apart from each other; and the first sub-pixel portion 110 and the second sub-pixel portion 120 share a common electrode 113. For example, each sub-pixel 100 is one display unit; the first sub-pixel portion 110 and the second sub-pixel portion 120 are two portions of the display unit; and the two portions are closely adjacent to each other and are used for displaying one sub-pixel 100 of the same color.

As shown in FIG. 2 to FIG. 3, the first sub-pixel portion 110 includes a first transistor 114; a first electrode 1141 of the first transistor 114 is connected with the first pixel electrode 111; the second sub-pixel portion 120 includes a second transistor 123 and a third transistor 124; a first electrode 1231 of the second transistor 123 and a first electrode 1241 of the third transistor 124 are both connected with the second pixel electrode 121; a control electrode 1143 of the first transistor 114 and a control electrode 1233 of the second transistor 123 are both connected with the same gate line 220; a second electrode 1142 of the first transistor 114 and a second electrode 1232 of the second transistor 123 are both connected with the same data line 210; and a control electrode 1243 of the third transistor 124 is connected with the first control signal line 310.

It should be noted that, all the transistors used in the embodiments of the present disclosure may be thin-film transistors, field effect transistors, or other switching devices having the same characteristics; and in all the embodiments of the present disclosure, description is provided by taking the thin-film transistor as an example. A source electrode and a drain electrode of a transistor used here may be symmetrical in structure, so the source electrode and the drain electrode thereof may be indistinguishable in structure. In the embodiments of the present disclosure, in order to distinguish the two electrodes of the transistor other than the gate electrode, one of the electrodes is directly described as a first electrode and the other electrode as a second electrode.

As shown in FIG. 2 to FIG. 3, the array substrate further includes a second control signal line 320; and the second sub-pixel portion 120 further includes an adjustable capacitor 125; a first electrode 1251 of the adjustable capacitor is connected with a second electrode 1242 of the third transistor 124; and the second control signal line 320 is connected with a second electrode 1252 of the adjustable capacitor 125 to apply a voltage to change a capacitance value of the adjustable capacitor 125.

In the array substrate provided by the present disclosure, the adjustable capacitor is provided in the second sub-pixel, which is favorable for alleviating color cast under a large viewing angle when the array substrate is used for display.

For example, the array substrate shown in FIG. 1 to FIG. 3 may be applied to a liquid crystal display apparatus adopting a multi-domain vertical alignment (VA) mode. For example, the multi-domain mode may by an 8-domain mode.

For example, as shown in FIG. 2 to FIG. 3, the first sub-pixel portion 110 may be a bright sub-pixel portion; the second sub-pixel portion 120 may be a dark sub-pixel portion; and by adjusting voltages on pixel electrodes of two pixel portions of the same sub-pixel, a deflection angle of liquid crystals may be adjusted to adjust brightness and darkness, to further correct color cast under a large viewing angle. For example, the first pixel electrode 111 and the second pixel electrode 121 both have a plate-like structure; and the common electrode 113 may include a strip-like structure. For example, one column of sub-pixels 100 are arranged between two adjacent data lines 210

In some examples, as shown in FIG. 1 to FIG. 3, the same gate line 220 electrically connected with both the control electrode of the first transistor 114 and the control electrode of the second transistor 123 is located between the first pixel electrode 111 and the second pixel electrode 121. By arranging the gate line between the first pixel electrode and the second pixel electrode, it is favorable for saving space to improve an aperture ratio of a sub-pixel, while facilitating electrical connection of the control electrode of the first transistor and the control electrode of the second transistor with the gate line.

For example, as shown in FIG. 2 to FIG. 3, the first pixel electrode 111 and the common electrode 113 form a storage capacitor 115 of the first sub-pixel portion 110; and the second pixel electrode 121 and the common electrode 113 form a storage capacitor 126 of the second sub-pixel portion 210.

For example, as shown in FIG. 2 to FIG. 3, a voltage of the gate line 220 is boosted, the first transistor 114 and the second transistor 123 are turned on, the data line 210 charges both the storage capacitor 115 of the first sub-pixel portion 110 and the storage capacitor 126 of the second sub-pixel portion 210 simultaneously, at this time, the storage capacitors of the first sub-pixel portion 110 and the second sub-pixel portion 120 have a consistent voltage, and the first sub-pixel portion 110 and the second sub-pixel portion 120 have the same brightness. After charging of the storage capacitors of the first sub-pixel portion 110 and the second sub-pixel portion 120 is completed, the voltage of the gate line 220 is bucked, and the first transistor 114 and the second transistor 123 are turned off. Then, a voltage of the first control signal line 310 is boosted, the third transistor 124 is turned on, and charges in the storage capacitor 126 of the second sub-pixel portion 120 charge the adjustable capacitor 125 through the third transistor 124. By adjusting the second electrode of the adjustable capacitor 125 through the second control signal line 320, that is, controlling the voltage of the electrode, the capacitance value of the adjustable capacitor 125 is adjusted, to further change the voltage on the second pixel electrode 121 in the second sub-pixel portion 120 to adjust the deflection angle of the liquid crystal until the problem of color cast under a large viewing angle is solved. Finally, the voltage of the second control signal line is bucked, and the third transistor 124 is turned off, to complete adjustment.

For example, as shown in FIG. 4, the adjustable capacitor 125 includes a first metal layer 01, an insulation layer 02, a semiconductor layer 03, and a second metal layer 04; and the first metal layer 01 is located between the second metal layer 02 and the base substrate. When the first metal layer 01 and the second metal layer 04 are powered on, an actual capacitance value of the adjustable capacitor 125 will change with the voltage of the first metal layer 01. For example, when the adjustable capacitor 125 is an N-type capacitor, as a voltage input to the first metal layer 01 is boosted, the capacitance value of the adjustable capacitor 125 increases; when the adjustable capacitor 125 is a P-type capacitor, as the voltage of the first metal layer 01 is boosted, the capacitance value of the adjustable capacitor 125 decreases.

In some examples, as shown in FIG. 2 and FIG. 3, an active layer 1140 of the first transistor 114, an active layer 1230 of the second transistor 123, an active layer 1240 of the third transistor 124, as well as the first electrode 1251 and the second electrode 1252 of the adjustable capacitor 125 are all located between the first pixel electrode 111 and the second pixel electrode 121. By arranging the active layers of the respective transistors and the adjustable capacitor all between the first pixel electrode and the second pixel electrode, it is favorable for saving space to improve an aperture ratio of a sub-pixel.

For example, as shown in FIG. 2, the active layer 1140 of the first transistor 114 and the active layer 1230 of the second transistor 123 are arranged along the first direction. For example, the active layer 1140 of the first transistor 114 and the active layer 1230 of the second transistor 123 may be an integrated structure, to further save space between two sub-pixel portions.

As shown in FIG. 2 and FIG. 3, a first protruding portion 121-1 is provided on a side of the second pixel electrode 121 that is close to the first pixel electrode 111; a second protruding portion 125-1 is provided on a side of the second electrode 1252 of the adjustable capacitor 125 that is close to the second pixel electrode 121; and the first control signal line 310 includes a bent portion 311 located between the first protruding portion 121-1 and the second protruding portion 125-1. Thus, in the display substrate, interference of the first control signal line on the storage capacitor and the adjustable capacitor is avoided while maximizing the storage capacitor of the first sub-pixel portion and the adjustable capacitance value range of the adjustable capacitor.

For example, as shown in FIG. 2, the second protruding portion 125-1 includes a second tilt side edge; the first protruding portion 121-1 includes a first tilt side edge; the first tilt side edge is substantially parallel to the second tilt side edge; and two edges of the bent portion 311 in the first control signal line 310 that are located between the two protruding portions are substantially parallel to the first tilt side edge and the second tilt side edge, respectively. For example, extension directions of the first tilt side edge and the second tilt side edge both intersect with the first direction and both intersect with the second direction.

For example, as shown in FIG. 2, a straight line extending along the X direction passes through the second protruding portion 125-1 and a gate electrode of the third transistor As shown in FIG. 2, the second protruding portion 125-1 of the second electrode 1252 of the adjustable capacitor 125 refers to a portion thereof protruding towards the second pixel electrode 121 relative to the second control signal line 320.

For example, as shown in FIG. 2, a distance D1 from the active layers of the first transistor 114 and the second transistor 123 (e.g., the active layer 1140 and the active layer 1230) to the first pixel electrode 111 is less than a distance D2 from the active layers to the second pixel electrode 121; an edge of the first pixel electrode 111 that is close to the active layer includes a protruding portion 111-1; and orthogonal projections of the protruding portion 111-1 and the active layer on a plane extending along the first direction and perpendicular to an XY plane do not overlap with each other. The protruding portion protruding towards the side close to the second pixel electrode is provided in the first pixel electrode, and the orthogonal projections of the protruding portion and the active layer on the plane extending along the first direction and perpendicular to the XY plane do not overlap with each other, which is favorable for maximizing the storage capacitor of the first sub-pixel, while preventing interference of the first pixel electrode on the active layers of the first transistor and the second transistor.

For example, a ratio of the distance D1 to the distance D2 as described above may be 0.5 to 5. For example, the ratio of the distance D1 to the distance D2 as described above may be 1 to 4. For example, the ratio of the distance D1 to the distance D2 as described above may be 2 to 3.5. For example, the ratio of the distance D1 to the distance D2 as described above may be 2 to 3.

For example, as shown in FIG. 2, the control electrode of the first transistor 114 and the control electrode of the second transistor 123 may be an integrated structure to save space. For example, the second electrode of the first transistor 114 and the second electrode of the second transistor 123 may be an integrated structure to save space.

In some examples, as shown in FIG. 1 to FIG. 4, the plurality of gate lines 220 is located between the plurality of data lines 210 and the base substrate 10; the second electrode 1252 of the adjustable capacitor 125 (the first metal layer 01 as shown in FIG. 4), the control electrodes of the respective transistors are all arranged in the same layer as the plurality of gate lines 220; the first electrode 1251 of the adjustable capacitor 125 (the second metal layer 04 as shown in FIG. 4) is arranged in the same layer as the plurality of data lines 210; a semiconductor layer 03 and an insulation layer 02 are arranged between the first electrode 1251 of the adjustable capacitor 125 and the second electrode 1252 of the adjustable capacitor 125; and the semiconductor layer 03 is arranged in the same layer as and spaced apart from the active layers (e.g., the active layer 1140 and the active layer 1230) of the respective transistors.

For example, as shown in FIG. 2, the control electrode of the first transistor 114, the control electrode of the second transistor 123, and the gate line 220 may be an integrated structure.

In some examples, as shown in FIG. 2, the first control signal line 310 is located between the first pixel electrode 111 and the second pixel electrode 121. In some examples, as shown in FIG. 2, the second control signal line 320 is located between the above-described same gate line 220 and the first control signal line 310. By setting the positions of the gate line, the first control signal line, and the second control signal line, it is favorable for saving layout space to improve layout utilization.

For example, as shown in FIG. 2, among the gate line 220, the first control signal line 310, and the second control signal line 320 located between the first pixel electrode 111 and the second pixel electrode 121, a distance between the gate line 220 (e.g., a position other than the control electrodes of the first transistor 114 and the second transistor 123) and the second control signal line 320 (e.g., a position other than the second electrode 1252 of the adjustable capacitor) is greater than a distance between the second control signal line 320 and the first control signal line 310 (e.g., a position other than the control electrode of the third transistor 124).

For example, as shown in FIG. 2, extension directions of the gate line 220, the first control signal line 310, and the second control signal line 320 are integrally a direction along the first direction. For example, an edge on a side of the second control signal line 320 that faces the gate line 220 may be a straight line edge extending along the first direction.

In some examples, as shown in FIG. 2 and FIG. 4, a straight line extending along the second direction passes through the active layer 1230 of the second transistor 123 and the semiconductor layer 03 of the adjustable capacitor 125. For example, orthogonal projections of the active layer 1230 of the second transistor 123 and the semiconductor layer 03 of the adjustable capacitor 125 on the plane extending along the first direction and perpendicular to the XY plane overlap with each other.

In some examples, as shown in FIG. 2, a straight line extending along the first direction passes through the control electrode of the third transistor 124 and the second electrode of the adjustable capacitor 125. For example, orthogonal projections of the control electrode of the third transistor 124 and the second electrode of the adjustable capacitor 125 on the plane extending along the second direction and perpendicular to the XY plane overlap with each other.

In the array substrate provided by the present disclosure, by setting the positional relationship among the second transistor, the adjustable capacitor, and the third transistor in the first direction and the second direction, it is favorable for maximizing areas of the active layers of the respective transistors and the semiconductor layer of the adjustable capacitor, and preventing the film layer from overlapping with the common electrode, while preventing interference between the active layers of the respective transistors and the semiconductor layer of the adjustable capacitor, and it is favorable for improving layout utilization and maximizing an aperture ratio of a sub-pixel, while reducing interference between the respective film layers.

For example, as shown in FIG. 2, the second electrode of the adjustable capacitor 125 includes a protruding portion protruding towards the first control signal line 310; and the first control signal line 310 is bent in a position corresponding to the above-described protruding portion.

In some examples, as shown in FIG. 2, the first electrode of the second transistor 123 and the first electrode of the third transistor 124 may be an integrated structure; and the first electrode of the third transistor 124 is arranged in the same layer as the plurality of data lines 210.

In some examples, as shown in FIG. 2, the second electrode of the third transistor 124 and the first electrode of the adjustable capacitor 125 may be an integrated structure; and the second electrode of the third transistor 124 is located between at least a portion of the first electrode of the second transistor 123 and the second pixel electrode 121.

When the second transistor, the third transistor, and the adjustable capacitor are all located between the first pixel electrode and the second pixel electrode, and are arranged to have a close distance to each other, by setting the first electrode of the second transistor and the first electrode of the third transistor as an integrated structure, and setting the second electrode of the third transistor and the first electrode of the adjustable capacitor as an integrated structure, it is favorable for saving layout space to improve an aperture ratio of a sub-pixel.

In some examples, as shown in FIG. 1 and FIG. 2, the plurality of sub-pixels 100 is arranged into a plurality of rows and columns of sub-pixels; and the plurality of rows of sub-pixels 100 is arranged along the second direction. For example, the first direction may be a row direction; and the second direction may be a column direction. Second electrodes of adjustable capacitors 125 in each row of sub-pixels 100 are connected with the same second control signal line 320, and a plurality of second control signal lines 320 connected with adjustable capacitors 125 of a plurality of rows of sub-pixels 100 is arranged along the second direction.

Figure 5:
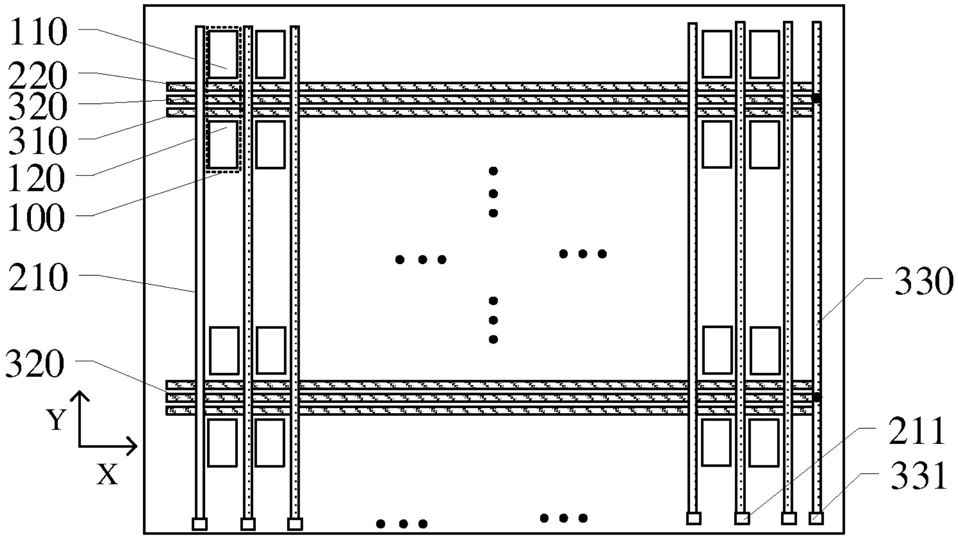
FIG. 5 and FIG. 6 are schematic diagrams of a partial planar structure of the array substrate provided by different examples of the embodiment of the present disclosure.
Figure 6:
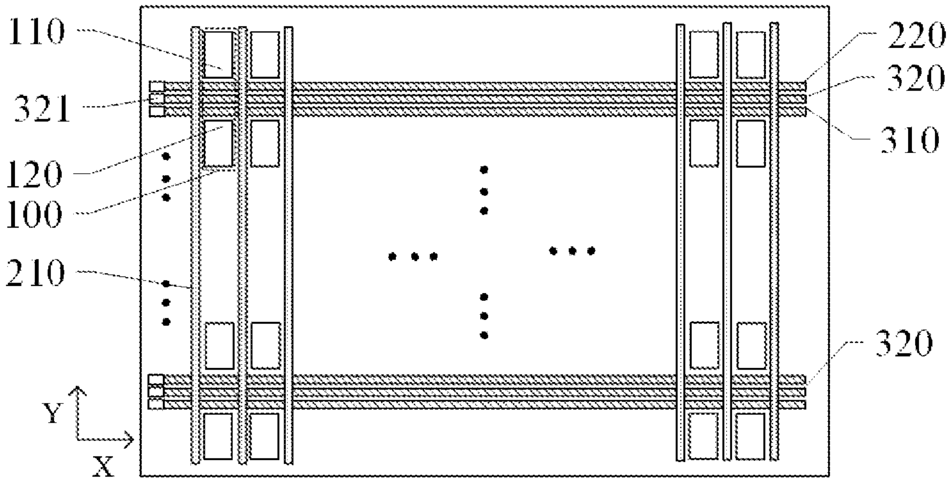

FIG. 5 and FIG. 6 are schematic diagrams of a partial planar structure of the array substrate provided by different examples of the embodiment of the present disclosure.

For example, as shown in FIG. 5, the array substrate further includes at least one third control signal line 330 and at least one pin 331 electrically connected with the at least one third control signal line 330; an extension direction of the at least one third control signal line 330 is the same as an extension direction of the data line 210; and the plurality of second control signal lines 320 is connected with the at least one third control signal line 330. FIG. 5 schematically shows one third control signal line 330; and all the second control signal lines 320 are electrically connected with the third control signal line 330 to have control signals transmitted. Of course, the number of third control signal lines is not limited to one; for example, the number of third control signal lines may be two, three, or more, to divide the plurality of rows of sub-pixels into a plurality of groups; and different third control signal lines are configured to transmit control signals to different groups of adjustable capacitors.

For example, as shown in FIG. 5, the third control signal line 330 and the data line 210 may be structures arranged in the same layer. Of course, the embodiment of the present disclosure is not limited thereto, for example, the third control signal line may be located on a side of the data line that is away from the base substrate.

For example, as shown in FIG. 5, the plurality of data lines 210 is electrically connected with a circuit board through a plurality of pins 211. For example, the circuit board includes a chip on film (COF), for example, the COF includes a source integrated circuit (Source IC). For example, the third control signal line 330 may be electrically connected with the Source IC through the pin 331. For example, when no third control signal line is provided in the array substrate, the above-described pin 331 may be a dummy pin, that is, a pin that is not input with any electrical signal; after the third control signal line is provided, the pin is electrically connected with the third control signal line and input with a corresponding control signal.

In some examples, as shown in FIG. 6, the array substrate further includes a plurality of pins 321; each second control signal line 320 is connected with one pin 321 so that each second control signal line 320 is configured to separately input a control signal. For example, the second control signal line 320 is electrically connected with a gate integrated circuit (Gate IC) through the pin 321; the gate line 220 is electrically connected with the Gate IC through the pin 321; and the Gate IC is configured to transmit signals to the gate line and the second control signal line 320.

For example, as shown in FIG. 6, the first control signal line 310 is connected with the pin 321 to be electrically connected with the Gate IC.

Figure 7:
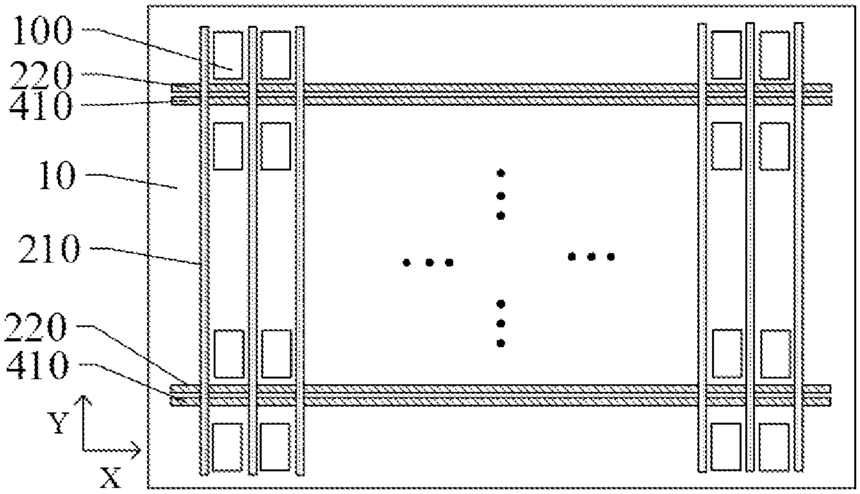
FIG. 7 is a schematic diagram of a partial planar structure of an array substrate provided by another embodiment of the present disclosure.
Figure 8:
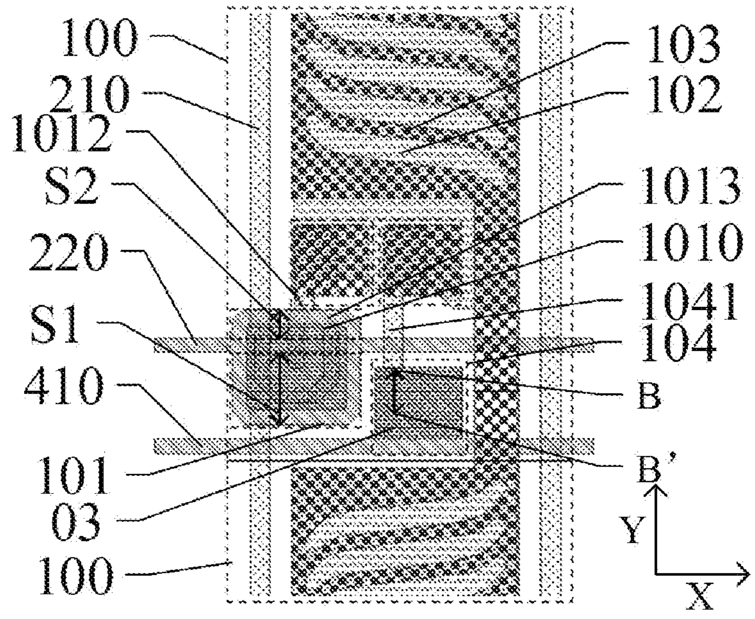
FIG. 8 is a schematic diagram of a partial structure of two adjacent sub-pixels in the array substrate shown in FIG. 7 and a connection relationship between the sub-pixels and a signal line.
Figure 9:
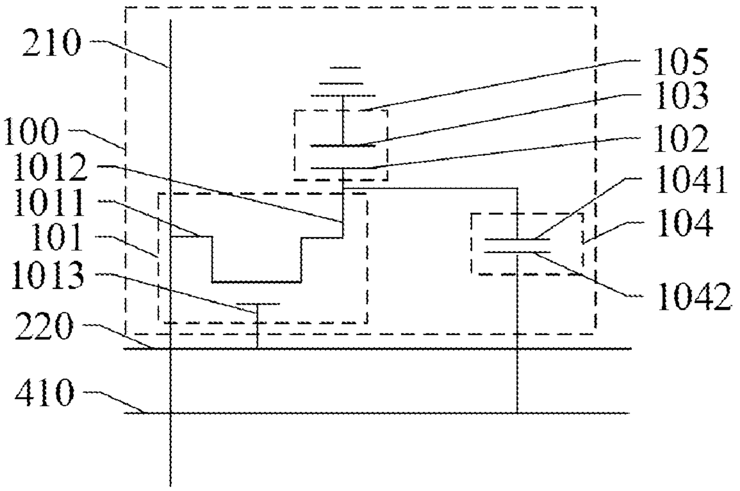
FIG. 9 is a schematic diagram of a circuit structure of the sub-pixel shown in FIG. 8.
Figure 10:
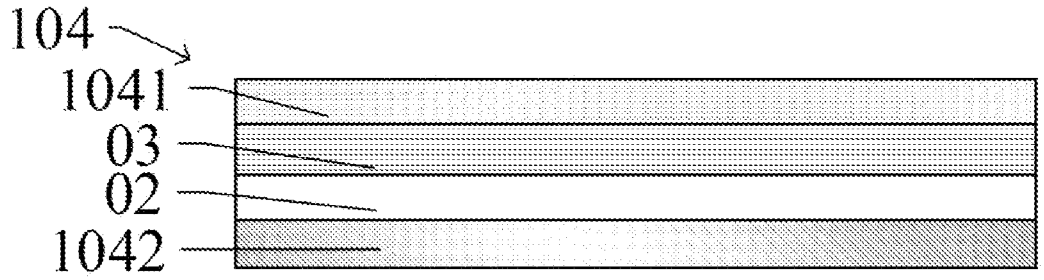
FIG. 10 is a schematic diagram of a cross-sectional structure of an adjustable capacitor sectioned by the line BB' shown in FIG. 8.

FIG. 7 is a schematic diagram of a partial planar structure of an array substrate provided by another embodiment of the present disclosure. FIG. 8 is a schematic diagram of a partial structure of two adjacent sub-pixels in the array substrate shown in FIG. 7 and a connection relationship between the sub-pixels and a signal line. FIG. 9 is a schematic diagram of a circuit structure of the sub-pixel shown in FIG. 8. FIG. 10 is a schematic diagram of a cross-sectional structure of an adjustable capacitor sectioned by the line BB' shown in FIG. 8.

As shown in FIG. 7, the array substrate includes a base substrate 10 as well as a plurality of sub-pixels 100, a plurality of data lines 210, and a plurality of gate lines 220 located on the base substrate 10. The plurality of sub-pixels 100 is arranged in an array along a first direction and a second direction; and the first direction and the second direction intersect with each other. For example, FIG. 7 schematically shows that the first direction is an X direction and the second direction is a Y direction, but it is not limited thereto, and the first direction and the second direction may be interchanged. For example, the first direction is perpendicular to the second direction. But it is not limited thereto, and an included angle between the first direction and the second direction may be 80 degrees to 100 degrees, for example, 85 degrees to 95 degrees, etc. For example, a region where the plurality of sub-pixels 100 is located is a display region for displaying images, for example, the array substrate further includes a peripheral region surrounding the display region.

As shown in FIG. 7, the plurality of data lines 210 is arranged along the first direction; and the plurality of gate lines 220 is arranged along the second direction. For example, the plurality of data lines 210 and the plurality of gate lines 220 intersect with each other to define regions where the respective sub-pixels 100 are located. For example, the gate line 220 is located between the data line 210 and the base substrate 10.

As shown in FIG. 8 to FIG. 9, the respective sub-pixels 100 each include a transistor 101 as well as a pixel electrode 102 and a common electrode 103 stacked, a first electrode 1011 of the transistor 101 is connected with the data line 210; a second electrode 1012 of the transistor 101 is connected with the pixel electrode 102; and a control electrode 1013 of the transistor 101 is connected with the gate line 220. For example, the pixel electrode 102 may have a plate-like structure; and the common electrode 103 may include a strip-like structure.

It should be noted that, all the transistors used in the embodiments of the present disclosure may be thin-film transistors, field effect transistors, or other switching devices having same characteristics; and in all the embodiments of the present disclosure, description is provided by taking the thin-film transistor as an example. A source electrode and a drain electrode of a transistor used here may be symmetrical in structure, so the source electrode and the drain electrode thereof may be indistinguishable in structure. In the embodiments of the present disclosure, in order to distinguish the two electrodes of the transistor other than the gate electrode, one of the electrodes is directly described as a first electrode and the other electrode as a second electrode.

As shown in FIG. 7 to FIG. 10, the array substrate further includes at least one control signal line 410; at least some sub-pixels 100 each further include an adjustable capacitor 104; the adjustable capacitor 104 includes a first electrode 1041, a semiconductor layer 03, and a second electrode 1042 sequentially stacked in a direction perpendicular to the base substrate 10; the semiconductor layer 03 is arranged in the same layer as and spaced apart from an active layer 1010 of the transistor 101; the first electrode 1041 of the adjustable capacitor 104 is connected with the pixel electrode 102; the control signal line 410 is connected with the second electrode 1042 of the adjustable capacitor 104 to apply a voltage to change a capacitance value of the adjustable capacitor 104; and a straight line extending along the first direction passes through the active layer 1010 and the semiconductor layer 03. For example, a capacitor 105 formed between the pixel electrode 102 and the common electrode 103, together with the adjustable capacitor 104, form a storage capacitor of the sub-pixel 100.

In the array substrate provided by the present disclosure, the adjustable capacitor is arranged in the sub-pixel, so that the storage capacitor of the sub-pixel is small to implement fast charging while implementing a high refresh rate; and the storage capacitor of the sub-pixel is large at a low refresh rate so that the pixel voltage may be better kept to implement compatibility with high and low refresh rates; and meanwhile, the positional relationship between the transistor and the adjustable capacitor is set, which may make layout compact, and is favorable for improving an aperture ratio of a sub-pixel.

For example, as shown in FIG. 8 and FIG. 9, when a display apparatus including the array substrate adopts a high-frequency refresh rate, a smaller storage capacitor is required for better charging, at this time, a voltage input to the adjustable capacitor is adjusted through the control signal line to minimize the capacitance value of the adjustable capacitor, so that the storage capacitor of the sub-pixel is small, which may facilitate charging and implement a high-frequency refresh rate. When the display apparatus including the array substrate adopts a low-frequency refresh rate, charging time is relatively long, and meanwhile the sub-pixel need to better keep the voltage, and at this time, a larger storage capacitor is required, so the control signal line adjusts the voltage input to the adjustable capacitor, to maximize the capacitance value of the adjustable capacitor, and at this time, the storage capacitor of the sub-pixel is large, which may implement a low-frequency refresh rate.

In some examples, as shown in FIG. 7 and FIG. 8, the gate line 220 is spaced apart from the control signal line 410; and the second electrode 1042 of the adjustable capacitor 104 is completely located between the control signal line 410 and the pixel electrode 102 connected with the first electrode 1041 of the adjustable capacitor 104.

In some examples, as shown in FIG. 7 and FIG. 8, the control electrode 1013 of the transistor 101 is arranged in the same layer as the gate line 220; for example, the control electrode 1013 of the transistor 101 and the gate line 220 may be an integrated structure, for example, a portion of the gate line 220 may be taken as a portion of the control electrode 1013. The control electrode 1013 includes two portions located on both sides of the gate line 220; one of the two portions that is close to the adjustable capacitor 104 has a first size S1 in the second direction; the other of the two portions that is away from the adjustable capacitor 104 has a second size S2 in the second direction; and the first size S1 is greater than the second size S2.

For example, as shown in FIG. 8, a ratio of the first size S1 to the second size S2 may be 1.5 to 10. For example, the ratio of the first size S1 to the second size S2 may be 2 to 3. For example, the ratio of the first size S1 to the second size S2 may be 2.5 to 8. On the basis of ensuring the gate electrode area of the transistor, the ratio of the first size to the second size is set as great as possible, which is favorable for maximizing an overlapping area between the semiconductor layer and the second electrode in the adjustable capacitor.

For example, as shown in FIG. 8, orthogonal projections of the second electrode 1042 of the adjustable capacitor 104 and the control electrode 1013 of the transistor 101 on a plane extending along the Y direction and perpendicular to the XY plane overlap with each other. For example, the second electrode 1042 of the adjustable capacitor 104 and the control electrode 1013 of the transistor 101 are structures arranged in the same layer.

By arranging most portion of the control electrode of the transistor between the gate line and the control signal line, and arranging the second electrode of the adjustable capacitor between the gate line and the control signal line, it is favorable for saving layout space in the second direction to further improve an aperture ratio of a sub-pixel, while implementing a larger channel region of the transistor and a larger overlapping area between the first electrode and the second electrode of the adjustable capacitor.

For example, as shown in FIG. 8, the first electrode 1011 and the second electrode 1012 of the transistor 101, the first electrode 1041 of the adjustable capacitor 104, and the data line 210 are structures arranged in the same layer.

In some examples, as shown in FIG. 8, the second electrode 1012 of the transistor 101 is spaced apart from the first electrode 1041 of the adjustable capacitor 104, which is favorable for preventing interference between the first electrode of the adjustable capacitor and the second electrode of the transistor, while saving layout space in the second direction.

For example, as shown in FIG. 8, a distance between the second electrode 1012 of the transistor 101 and the first electrode 1041 of the adjustable capacitor 104 is greater than a size of the first electrode 1041 of the adjustable capacitor 104 in the first direction.

In some examples, as shown in FIG. 7 and FIG. 8, the control signal line 410 and the gate line 220 are arranged in the same layer; the plurality of sub-pixels 100 is arranged into a plurality of rows and columns of sub-pixels 100; a plurality of rows of sub-pixels 100 is arranged along the second direction; second electrodes of adjustable capacitors 104 in each row of sub-pixels 100 are connected with the same control signal line 410; and a plurality of control signal lines 410 connected with adjustable capacitors 104 of a plurality of rows of sub-pixels 100 is arranged along the second direction. For example, the first direction may be a row direction; and the second direction may be a column direction.

For example, as shown in FIG. 7, the plurality of control signal lines 410 and the plurality of gate lines 220 are arranged alternately along the second direction.

Figure 11:
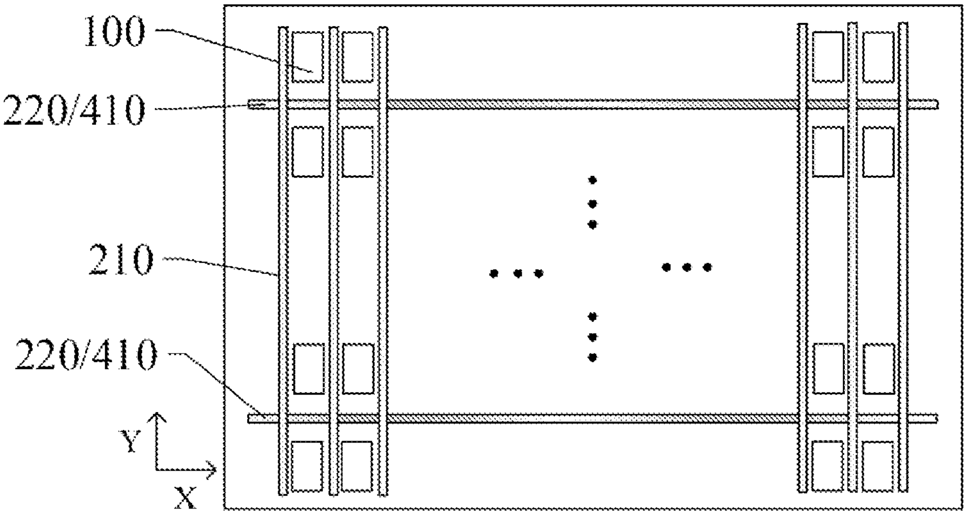
FIG. 11 is a schematic diagram of a partial planar structure of the array substrate provided by another example of the embodiment of the present disclosure.

FIG. 11 is a schematic diagram of a partial planar structure of the array substrate provided by another example of the embodiment of the present disclosure. The array substrate shown in FIG. 11 differs from the array substrate shown in FIG. 7 in that at least one gate line 220 is also used as a control signal line 410. For example, the respective gate lines 220 are each also used as a control signal line 410. For example, a gate signal transmitted by a gate line 220 may be also used as a control signal transmitted by a control signal line 410.

In the array substrate provided by the example, by multiplexing the gate line into the control signal line connected with the adjustable capacitor, it is favorable for saving layout space.

Figure 12:
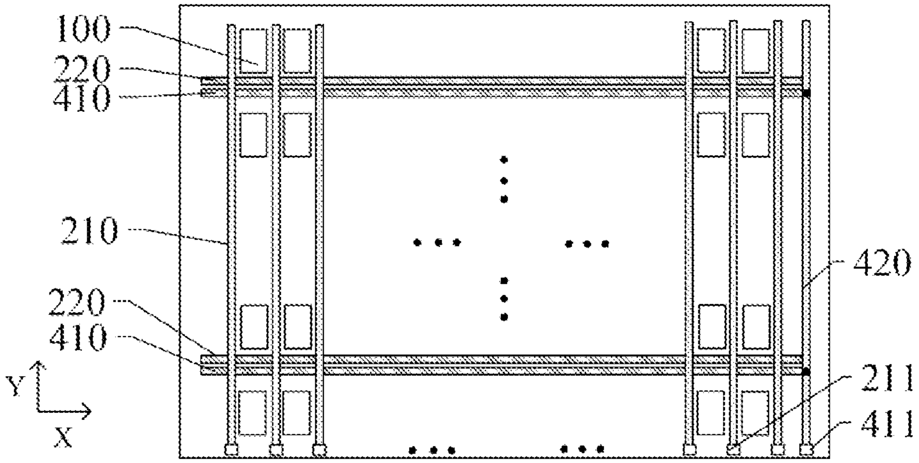
FIG. 12 to FIG. 14 are schematic diagrams of a partial planar structure of the array substrate provided by different examples of the embodiment of the present disclosure.
Figure 13:
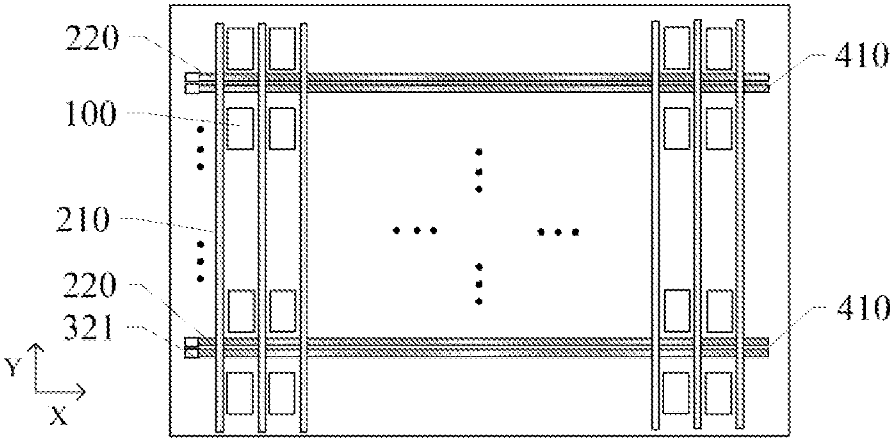
Figure 14:
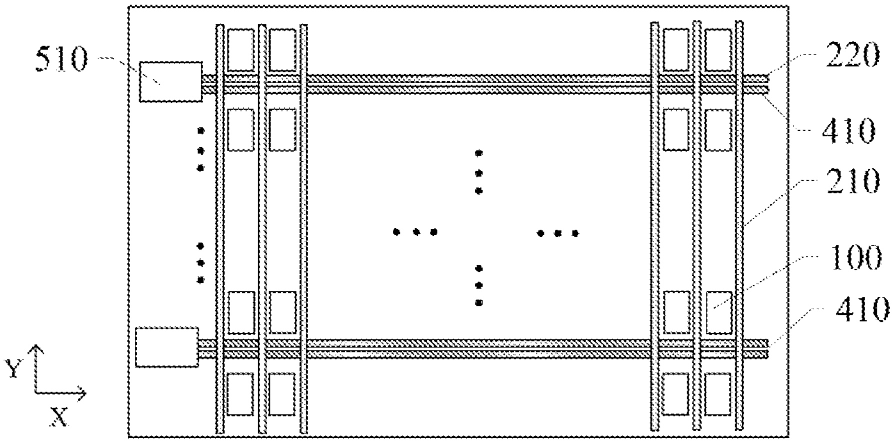

FIG. 12 to FIG. 14 are schematic diagrams of a partial planar structure of the array substrate provided by different examples of the embodiment of the present disclosure.

For example, as shown in FIG. 12, the array substrate further includes at least one control signal connection line 420 and at least one pin 411 electrically connected with the at least one control signal connection line 420; an extension direction of the at least one control signal connection line 420 is the same as the extension direction of the data line 210; and the plurality of control signal lines 410 is connected with the at least one control signal connection line 420. FIG. 12 schematically shows one control signal connection line 420, and all control signal lines 410 are electrically connected with the one control signal connection line 420 to have control signals transmitted. Of course, the number of control signal connection lines is not limited to one, for example, the number of control signal connection lines may be two, three, or more to divide a plurality of rows of sub-pixels into a plurality of groups; and different control signal connection lines are configured to transmit control signals to different groups of adjustable capacitors.

For example, as shown in FIG. 12, the control signal connection line 420 and the data line 210 may be structures arranged in the same layer. Of course, the embodiment of the present disclosure is not limited thereto, for example, the control signal connection line may be located on a side of the data line that is away from the base substrate.

For example, as shown in FIG. 12, the plurality of data lines 210 is electrically connected with a circuit board through a plurality of pins 211. For example, the circuit board includes a chip on film (COF), for example, the COF includes a source integrated circuit (Source IC). For example, the control signal connection line 420 may be electrically connected with the Source IC through the pin 411. For example, when no control signal connection line is provided in the array substrate, the above-described pin 411 may be a dummy pin, that is, a pin that is not input with any electrical signal; and after the control signal connection line is provided, the pin is electrically connected with the control signal connection line and input with a corresponding control signal.

In some examples, as shown in FIG. 13, the array substrate further includes a plurality of pins 321; each control signal line 410 is connected with one pin 321 so that each control signal line 410 is configured to separately input a control signal. For example, the control signal line 410 is electrically connected with a gate integrated circuit (Gate IC) through the pin 321; the gate line 220 is electrically connected with the Gate IC through the pin 321; and the Gate IC is configured to transmit signals to the gate line and the control signal line 410

Figure 15:
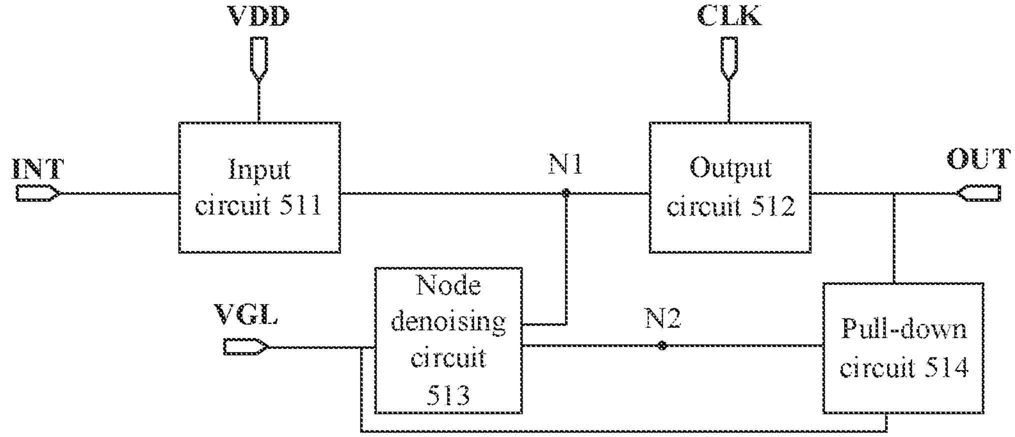
FIG. 15 is a schematic diagram of a circuit of one shift register unit in the array substrate shown in FIG. 14.

FIG. 15 is a schematic diagram of a circuit of one shift register unit in the array substrate shown in FIG. 14.

In some examples, as shown in FIG. 14 and FIG. 15, the array substrate further includes a plurality of rows of shift register units 510 located on the base substrate 10. The shift register unit 510 includes an input circuit 511, an output circuit 512, and a node denoising circuit 513; the input circuit 511 is connected with a first node N1 and is configured to supply an input signal to the first node N1; the node denoising circuit 513 is connected with the first node N1 and a second node N2, and is configured to denoise the first node N1 under control of a level of the second node N2; the output circuit 512 is connected with the first node N1 and an output end OUT, and is configured to output an output signal at the output end OUT under control of a level of the first node N1. Each control signal line 410 is connected with second nodes N2 of shift register units 510 located in the same row.

For example, the control signal line 410 may be transited to a position of the second node N2 through a film layer arranged in the same layer as the pixel electrode.

For example, as shown in FIG. 14 and FIG. 15, the output end OUT of the shift register unit 510 is connected with the gate line 220 to transmit a gate signal to the gate line 220. For example, the output circuit 512 is connected with a clock signal end CLK.

For example, as shown in FIG. 15, the node denoising circuit 513 may include one transistor; a gate electrode of the transistor is connected with the second node N2; a first electrode of the transistor is connected with the N1 node; a second electrode of the transistor is connected with a voltage end VGL, and under control of the second node N2, the transistor bucks the first node N1 to denoise the same. For example, the shift register unit 510 further includes a pull-down circuit 514; the pull-down circuit 514 is connected with the second node N2 and the voltage end VGL, and is configured to output a low-level voltage of the voltage end VGL to the output end OUT under control of the second node N2.

Figure 17:
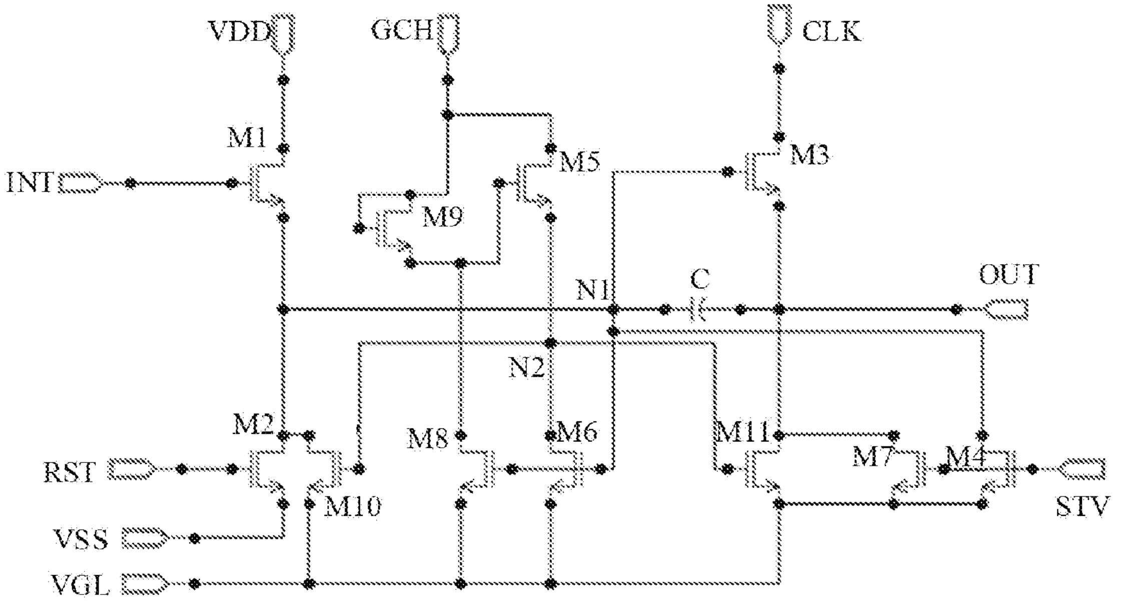
FIG. 17 is a circuit diagram of a specific implementation example of the shift register unit shown in FIG. 16.

The shift register unit shown in FIG. 15 may adopt a specific implementation circuit diagram shown in FIG. 17, for example, an 11T1C circuit, where, T represents a transistor and C represents a capacitor. But it is not limited thereto, and the shift register unit shown in FIG. 15 may also adopt other circuit, for example, 9T1C, 10T1C, etc.

Figure 16:
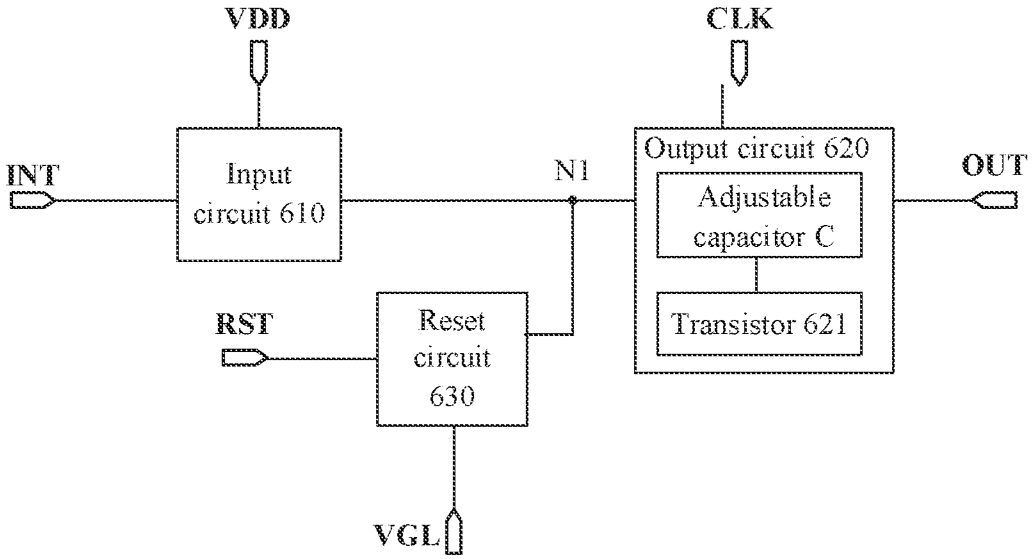
FIG. 16 is a schematic diagram of a shift register unit provided by another embodiment of the present disclosure.
Figure 18:
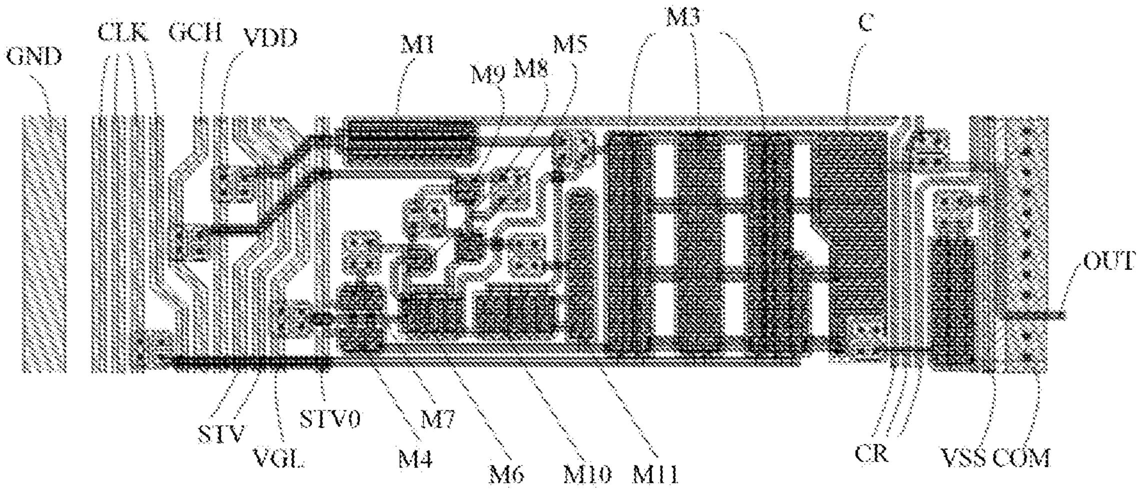
FIG. 18 is a layout of the circuit shown in FIG. 17.
Figure 19:
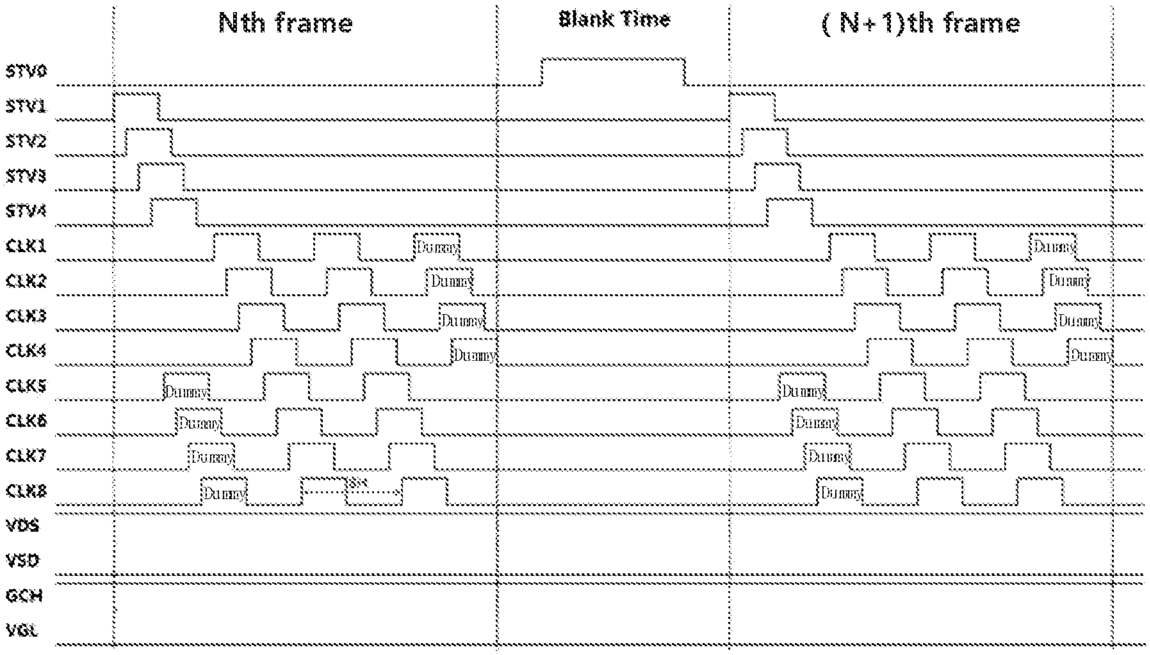
FIG. 19 is an operation timing diagram of the shift register unit shown in FIG. 17.

FIG. 16 is a schematic diagram of a shift register unit provided by another embodiment of the present disclosure. FIG. 17 is a circuit diagram of a specific implementation example of the shift register unit shown in FIG. 16. FIG. 18 is a layout of the circuit shown in FIG. 17. FIG. 19 is an operation timing diagram of the shift register unit shown in FIG. 17.

As shown in FIG. 16, the shift register unit includes an input circuit 610, an output circuit 620, and a reset circuit 630. The input circuit 610 is connected with the first node N1 and is configured to supply an input signal to the first node N1; the reset circuit 630 is connected with the first node N1 and a reset end RST, and is configured to reset the first node N1 in response to a reset signal supplied by the reset end RST; the output circuit 620 is connected with the first node N1 and an output end OUT, and is configured to output an output signal at the output end OUT under control of a level of the first node N1. The output circuit 620 includes an adjustable capacitor C; a first electrode of the adjustable capacitor C is connected with the output end OUT; and the first node N1 is connected with a second electrode of the adjustable capacitor C to change a capacitance value of the adjustable capacitor C when a voltage of the first node N1 changes.

As shown in FIG. 16 to FIG. 18, the output circuit 610 includes a transistor 621 electrically connected with the adjustable capacitor C, for example, a third transistor M3 as described below; a control electrode of the transistor 621 is connected with the first node N1; one electrode of the transistor 621 is connected with the second electrode of the adjustable capacitor C; a semiconductor layer and an insulation layer are arranged between the first electrode of the adjustable capacitor C and the second electrode of the adjustable capacitor C; and an active layer of the transistor 621 is arranged in the same layer as the semiconductor layer of the adjustable capacitor C.

For example, the respective film layers in the adjustable capacitor may be as shown in FIG. 4, and include a first metal layer 01, an insulation layer 02, a semiconductor layer 03, and a second metal layer 04 sequentially stacked. For example, the first electrode of the adjustable capacitor may be a structure arranged in the same layer as and electrically connected with a source electrode or a drain electrode of the transistor M3, for example, the two may be an integrated structure; the second electrode of the adjustable capacitor may be a structure arranged in the same layer as and electrically connected with a gate electrode of the transistor M3, for example, the two may be an integrated structure; and the semiconductor layer of the adjustable capacitor may be a structure arranged in the same layer as and spaced apart from an active layer of the transistor M3.

In the shift register provided by the present disclosure, a control end of the adjustable capacitor is connected with the first node; the capacitance value of the adjustable capacitor increases as the voltage of the first node is boosted; when the first node charges, an initial capacitance value of the adjustable capacitor is small, so that the voltage at the first node may be rapidly boosted to improve low-temperature startup capability; after the voltage of the first node is boosted, the capacitance value of the adjustable capacitor increases; when the display apparatus including the shift register is applied in a touch stage, the voltage of the first node may be better kept; and when the first node discharges, the capacitance value of the adjustable capacitor decreases therewith, allowing the first node to discharge rapidly.

In some examples, as shown in FIG. 16 and FIG. 17, the input circuit 610 includes a first transistor M1; a first electrode of the first transistor M1 is connected with a first power supply end VDD; a second electrode of the first transistor M1 is connected with the first node N1, and a gate electrode of the first transistor M1 is connected with a first signal control end INT. When the first signal control end INT outputs a high level, the first transistor M1 is turned on, outputting a voltage of the first power supply end VDD to the first node N1 for charging the first node N1. The first node N1 may be referred to as a boost node. When the first power supply end VDD supplies a voltage to the first node N1, the capacitance value of the adjustable capacitor increases as the voltage of the first node is boosted.

In some examples, as shown in FIG. 16 and FIG. 17, the reset circuit 630 includes a second transistor M2; a first electrode of the second transistor M2 is connected with the first node N1; a second electrode of the second transistor M2 is connected with a second power supply end VSS; and a gate electrode of the second transistor M2 is connected with a second signal control end RST. For example, the second transistor M2 outputs a voltage of the second power supply end VSS to the first node N1 under control of the second signal control end RST, for resetting the first node N1.

In some examples, as shown in FIG. 16 and FIG. 17, the output circuit 620 further includes a third transistor M3; a first electrode of the third transistor M3 is connected with a clock signal end CLK; a second electrode of the third transistor M3 is connected with the first electrode of the adjustable capacitor C; and a gate electrode of the third transistor M3 is connected with the first node N1. The third transistor M3 is turned on under control of a high potential of the first node N1, outputting a low level of the clock signal end CLK to the output end OUT In some examples, as shown in FIG. 16 and FIG. 17, the shift register unit further includes a fourth transistor M4, a fifth transistor MS, a sixth transistor M6, a seventh transistor M7, an eighth transistor M8, a ninth transistor M9, a tenth transistor M10, and an eleventh transistor M11.

In some examples, as shown in FIG. 16 and FIG. 17, the fourth transistor M4 may be a structure in the boost node reset circuit; the boost node reset circuit is configured to output a voltage of the third voltage end VGL to the first node N1 under control of a frame reset signal end STV. A first electrode of the fourth transistor M4 is connected with the first node N1; a second electrode of the fourth transistor M4 is connected with the third voltage end VGL; and a gate electrode of the fourth transistor M4 is connected with the frame reset signal end STV. For example, when the frame reset signal end STV outputs a high level, the fourth transistor M4 is turned on, so that the fourth transistor M4 inputs a low level of the third voltage end VGL to the first node N1 to reset the first node N1. For example, when the frame reset signal end STV outputs a low level, the fourth transistor M4 is turned off.

In some examples, as shown in FIG. 16 and FIG. 17, the fifth transistor M5, the ninth transistor M9, the eighth transistor M8, and the sixth transistor M6 are structures in a buck control circuit. A first electrode of the fifth transistor MS is connected with a fourth voltage end GCH; a second electrode of the fifth transistor M5 is connected with the second node N2; a gate electrode of the fifth transistor M5 is connected with a second electrode of the ninth transistor M9; a first electrode of the ninth transistor M9 is connected with the fourth voltage end GCH; a gate electrode of the ninth transistor M9 is connected with the fourth voltage end GCH; a first electrode of the sixth transistor M6 is connected with the second node N2; a second electrode of the sixth transistor M6 is connected with the third voltage end VGL; a gate electrode of the sixth transistor M6 is connected with the first node N1; a first electrode of the eighth transistor M8 is connected with the gate electrode of the fifth transistor MS; a second electrode of the eighth transistor M8 is connected with the third voltage end VGL; and a gate electrode of the eighth transistor M8 is connected with the first node N1

For example, as shown in FIG. 17, the buck control circuit may control the potential of the second node N2, so that the second node N2 may control the denoising circuit (including the tenth transistor M10 as described below) to buck the potential of the first node N1 to the potential of the fourth voltage end GCH, so as to denoise the first node N1. For example, the sixth transistor M6 is turned on under control of the high potential of the first node N1, and the fifth transistor M5 is turned on under control of the high GCH level of the fourth voltage end; however, because a width-length ratio of a channel of the sixth transistor M6 is greater than a width-length ratio of a channel of the fifth transistor M5, the potential of the second node N2 will still be bucked to the low level of the third voltage end VGL through the sixth transistor M6. For example, the sixth transistor M6 and the eighth transistor M8 are turned on under control of the high potential of the first node N1, and the ninth transistor M9 is turned on under control of the high level of the fourth voltage end GCH; however, because a width-length ratio of a channel of the eighth transistor M8 is greater than a width-length ratio of a channel of the ninth transistor M9, the gate electrode of the fifth transistor MS is at a low level, which controls the fifth transistor M5 being turned off, and the potential of the second node N2 will still be bucked to the low level of the third voltage end VGL through the sixth transistor M6.

In some examples, as shown in FIG. 16 and FIG. 17, the seventh transistor M7 is a structure included in the output end reset circuit. The signal output end reset circuit is connected with the frame reset signal end STV, the third voltage end VGL, and the output end OUT, and is configured to output a voltage of the third voltage end VGL to the signal output end OUT under control of the frame reset signal end STV. A first electrode of the seventh transistor M7 is connected with the first node N1; a second electrode of the seventh transistor M7 is connected with the third voltage end VGL, and a gate electrode of the seventh transistor M7 is connected with the frame reset signal end STV.

For example, as shown in FIG. 17, the frame reset signal end STV inputs a low level, so that the seventh transistor M7 is turned off. For example, the STV frame reset signal end inputs a high level, to turn on the seventh transistor M7, so that the seventh transistor M7 inputs the low level of the third voltage end VGL to the output end OUT, to reset the output end OUT.

In some examples, as shown in FIG. 16 and FIG. 17, the tenth transistor M10 is a structure included in the denoising circuit. The denoising circuit is connected with the second node N2, the third voltage end VGL, and the first node N1, and is configured to output a voltage of the third voltage end VGL to the first node N1 under control of the second node N2. A first electrode of the tenth transistor M10 is connected with the first node N1; a second electrode of the tenth transistor M10 is connected with the third signal end VGL; and a gate electrode of the tenth transistor M10 is connected with the second node N2

In some examples, as shown in FIG. 16 and FIG. 17, the eleventh transistor M11 is a structure in a pull-down circuit. The pull-down circuit is connected with the second node N2, the third voltage end VGL, and the output end OUT, and is configured to output a voltage of the third voltage end VGL to the signal output end OUT under control of the second node N2. A first electrode of the eleventh transistor M11 is connected with the second electrode of the third transistor M3; a second electrode of the eleventh transistor M11 is connected with the third voltage end VGL; and a gate electrode of the eleventh transistor M11 is connected with the first node N1.

For example, as shown in FIG. 17, the sixth transistor M6 is turned off under control of the low potential of the first node N1; the fifth transistor M5 is turned on under control of the high level of the fourth voltage end GCH, and outputs the high level of the fourth voltage end GCH to the second node N2; both the tenth transistor M10 and the eleventh transistor M11 are turned on under control of the high potential of the second node N2; the potential of the first node N1 is bucked to the low level of the third voltage end VGL through the tenth transistor M10; and the potential of the signal output end OUT is bucked to the low level of the third voltage end VGL through the eleventh transistor M11.

In the embodiments of the present disclosure, for example, when the respective circuits are implemented as N-type transistors, the term "boost" refers to charging a node or an electrode of a transistor to increase an absolute value of a level of the node or the electrode, so as to implement an operation of (e.g., turning on) the corresponding transistor; the term "buck" refers to discharging a node or an electrode of a transistor to decrease an absolute value of a level of the node or the electrode, so as to implement an operation of (e.g., turning off) the corresponding transistor.

For another example, when the respective circuits are implemented as P-type transistors, the term "boost" refers to discharging a node or an electrode of a transistor to decrease an absolute value of a level of the node or the electrode, so as to implement an operation of (e.g., turning on) the corresponding transistor; the term "buck" refers to charging a node or an electrode of a transistor to increase an absolute value of a level of the node or the electrode, so as to implement an operation of (e.g., turning off) the corresponding transistor.

It should be noted that, in the description of the respective embodiments of the present disclosure, the first node N1 and the second node N2 do not represent components that must actually exist, but represent meeting points of related electrical connections in the circuit diagram.

It should be noted that, all the transistors used in the embodiments of the present disclosure may be thin-film transistors, field effect transistors, or other switching devices having same characteristics; and in all the embodiments of the present disclosure, description is provided by taking the thin-film transistor as an example. A source electrode and a drain electrode of a transistor used here may be symmetrical in structure, so the source electrode and the drain electrode thereof may be indistinguishable in structure. In the embodiments of the present disclosure, in order to distinguish the two electrodes of the transistor other than the gate electrode, one of the electrodes is directly described as a first electrode and the other electrode as a second electrode.

In addition, the transistors according to the embodiments of the present disclosure are all described by taking N-type transistors as an example, and at this time, the first electrode of the transistor is the drain electrode, the second electrode is the source electrode. It should be noted that, the present disclosure includes but is not limited thereto. For example, one or more transistors in the shift register unit provided by the embodiments of the present disclosure may also be P-type transistors, and at this time, the first electrode of the transistor is the source electrode, and the second electrode is the drain electrode, as long as the respective electrodes of the transistor with a selected type are correspondingly connected with the respective electrodes of the corresponding transistor according to the embodiments of the present disclosure, and the corresponding voltage end is made to supply a high voltage or a low voltage corresponding thereto. When an N-type transistor is used, indium gallium zinc oxide (IGZO) may be used as an active layer of the thin-film transistor, which, as compared with a case where low temperature poly silicon (LTPS) or amorphous silicon (e.g., hydrogenated amorphous silicon) is used as the active layer of the thin-film transistor, may effectively reduce a size of the transistor and prevent a leakage current.

For example, as shown in FIG. 19, the frame reset signal end STV turns on 4 rows of dummy shift register units; the OUT output signal corresponds to the clock signal end CLK5-6, and subsequently, the respective rows of shift register units are sequentially turned on, and at the same time, matched with corresponding CLK outputs. FIG. 19 schematically shows an Nth frame and an (N+1)th frame, as well as blank time between the two. N may be a positive integer greater than or equal to 1.

An embodiment of the present disclosure further provides a gate driving circuit, including a plurality of cascaded shift register units, in which any one or more shift register units may adopt the structure or variation of the shift register units provided by any embodiment of the present disclosure, for example, may adopt the shift register unit shown in FIG. 17. For example, the gate driving circuit may be directly integrated onto the array substrate of the display apparatus by using the same semiconductor fabrication process as the thin-film transistor, to implement a progressive or interlaced scan driving function.

An embodiment of the present disclosure provides a display apparatus, including any one of the above-described array substrates or the above-described shift register units.

The display apparatus according to this embodiment may be a liquid crystal panel, a liquid crystal television, a monitor, a mobile phone, a tablet personal computer, a laptop, a digital photo frame, a navigator, and any other product or component having a display function. The display apparatus may further include other conventional components such as a display panel, which will not be limited in the embodiments of the present disclosure.

The corresponding description of the array substrate and the shift register units according to the above-described embodiments may be referred to for the technical effects of the display apparatus provided by the embodiments of the present disclosure, and no details will be repeated here.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. An array substrate, comprising:
a base substrate;
a plurality of sub-pixels, located on the base substrate, the plurality of sub-pixels being arranged in an array along a first direction and a second direction, and the first direction intersecting with the second direction;
a plurality of data lines, located on the base substrate and arranged along the first direction;
a plurality of gate lines, located on the base substrate and arranged along the second direction;
a plurality of first control signal lines, located on the base substrate and arranged along the second direction;
wherein each sub-pixel among at least some sub-pixels comprises a first sub-pixel portion and a second sub-pixel portion arranged along the second direction; the first sub-pixel portion comprises a first pixel electrode; the second sub-pixel portion comprises a second pixel electrode; the first pixel electrode and the second pixel electrode are spaced apart from each other; and the first sub-pixel portion and the second sub-pixel portion share a common electrode;
the first sub-pixel portion comprises a first transistor; a first electrode of the first transistor is connected with the first pixel electrode; the second sub-pixel portion comprises a second transistor and a third transistor; a first electrode of the second transistor and a first electrode of the third transistor are both connected with the second pixel electrode; a control electrode of the first transistor and a control electrode of the second transistor are both connected with a same gate line; a second electrode of the first transistor and a second electrode of the second transistor are both connected with a same data line; and a control electrode of the third transistor is connected with the first control signal line;
the array substrate further comprises a second control signal line; the second sub-pixel portion further comprises an adjustable capacitor; a first electrode of the adjustable capacitor is connected with the second electrode of the third transistor; and the second control signal line is connected with a second electrode of the adjustable capacitor to apply a voltage to change a capacitance value of the adjustable capacitor;
a semiconductor layer and an insulation layer are arranged between the first electrode of the adjustable capacitor and the second electrode of the adjustable capacitor; the semiconductor layer, an active layer of the first transistor, an active layer of the second transistor, and an active layer of the third transistor are all arranged in a same layer;
a first protruding portion is provided on a side of the second pixel electrode that is close to the first pixel electrode; a second protruding portion is provided on a side of the second electrode of the adjustable capacitor that is close to the second pixel electrode; and the first control signal line comprises a bent portion located between the first protruding portion and the second protruding portion.

2. The array substrate according to claim 1, wherein the active layer of the first transistor, the active layer of the second transistor, the active layer of the third transistor, as well as the first electrode and the second electrode of the adjustable capacitor are all located between the first pixel electrode and the second pixel electrode.

3. The array substrate according to claim 2, wherein the same gate line electrically connected with the control electrode of the first transistor and the control electrode of the second transistor is located between the first pixel electrode and the second pixel electrode.

4. The array substrate according to claim 3, wherein the first control signal line is located between the first pixel electrode and the second pixel electrode.

5. The array substrate according to claim 4, wherein the second control signal line is located between the same gate line and the first control signal line.

6. The array substrate according to claim 1, wherein the plurality of gate lines are located between the plurality of data lines and the base substrate; the second electrode of the adjustable capacitor, and the control electrodes of respective transistors are all arranged in the same layer as the plurality of gate lines; and the first electrode of the adjustable capacitor is arranged in the same layer as the plurality of data lines.

7. The array substrate according to claim 1, wherein a straight line extending along the second direction passes through the active layer of the second transistor and the semiconductor layer of the adjustable capacitor.

8. The array substrate according to claim 6, wherein a straight line extending along the first direction passes through the control electrode of the third transistor and the second electrode of the adjustable capacitor.

9. The array substrate according to claim 1, wherein the first electrode of the second transistor and the first electrode of the third transistor are an integrated structure; and the first electrode of the third transistor is arranged in the same layer as the plurality of data lines.

10. The array substrate according to claim 1, wherein the second electrode of the third transistor and the first electrode of the adjustable capacitor are an integrated structure; and the second electrode of the third transistor is located between at least a portion of the first electrode of the second transistor and the second pixel electrode.

11. The array substrate according to claim 1, wherein the plurality of sub-pixels are arranged into a plurality of rows and columns of sub-pixels; the plurality of rows of sub-pixels are arranged along the second direction; second electrodes of adjustable capacitors in each row of sub-pixels are connected with a same second control signal line; and a plurality of second control signal lines connected with adjustable capacitors of the plurality of rows of sub-pixels are arranged along the second direction.

12. The array substrate according to claim 11, further comprising:
at least one third control signal line and at least one pin electrically connected with the at least one third control signal line,
wherein an extension direction of the at least one third control signal line is the same as an extension direction of the data line; and the plurality of second control signal lines are connected with the at least one third control signal line.

13. An array substrate, comprising:
a base substrate;
a plurality of sub-pixels, located on the base substrate; the plurality of sub-pixels being arranged in an array along a first direction and a second direction; and the first direction intersecting with the second direction;
a plurality of data lines, located on the base substrate and arranged along the first direction;

a plurality of gate lines, located on the base substrate and arranged along the second direction;

wherein respective sub-pixels each comprise a transistor as well as a pixel electrode and a common electrode stacked; a first electrode of the transistor is connected with the data line; a second electrode of the transistor is connected with the pixel electrode; and a control electrode of the transistor is connected with the gate line;

the array substrate further comprises at least one control signal line; and at least some sub-pixels each further comprise an adjustable capacitor; the adjustable capacitor comprises a first electrode, a semiconductor layer, and a second electrode sequentially stacked in a direction perpendicular to the base substrate; the semiconductor layer is arranged in the same layer as and spaced apart from an active layer of the transistor; the first electrode of the adjustable capacitor is connected with the pixel electrode; the control signal line is connected with the second electrode of the adjustable capacitor to apply a voltage to change a capacitance value of the adjustable capacitor; and a straight line extending along the first direction passes through the active layer and the semiconductor layer.

14. The array substrate according to claim 13, wherein at least one gate line is also used as the control signal line.

15. The array substrate according to claim 13, wherein the gate line is spaced apart from the control signal line; and the second electrode of the adjustable capacitor is completely located between the control signal line and the pixel electrode connected with the first electrode of the adjustable capacitor.

16. The array substrate according to claim 15, wherein the control electrode of the transistor is arranged in the same layer as the gate line; the control electrode comprises two portions located on both sides of the gate line; one of the two portions that is close to the adjustable capacitor has a first size in the second direction; the other of the two portions that is away from the adjustable capacitor has a second size in the second direction; and the first size is greater than the second size.

17. The array substrate according to claim 13, wherein the second electrode of the transistor is spaced apart from the first electrode of the adjustable capacitor.

18. A shift register unit, comprising an input circuit, an output circuit, and a reset circuit, wherein the input circuit is connected with a first node, and is configured to supply an input signal to the first node;

the reset circuit is connected with the first node and a reset end, and is configured to reset the first node in response to a reset signal supplied by the reset end;

the output circuit is connected with the first node and an output end, and is configured to output an output signal at the output end under control of the level of the first node, the output circuit comprises an adjustable capacitor; a first electrode of the adjustable capacitor is connected with the output end; the first node is connected with a second electrode of the adjustable capacitor to change a capacitance value of the adjustable capacitor when a voltage of the first node changes;

the output circuit comprises a transistor electrically connected with the adjustable capacitor; a control electrode of the transistor is connected with the first node; one electrode of the transistor is connected with the second electrode of the adjustable capacitor; a semiconductor layer and an insulation layer are arranged between the first electrode of the adjustable capacitor and the second electrode of the adjustable capacitor; and an active layer of the transistor is arranged in the same layer as the semiconductor layer of the adjustable capacitor.

19. The shift register unit according to claim 18, wherein the input circuit comprises a first transistor; a first electrode of the first transistor is connected with a first power supply end; a second electrode of the first transistor is connected with the first node; and a gate electrode of the first transistor is connected with a first signal control end;

the reset circuit comprises a second transistor; a first electrode of the second transistor is connected with the first node; a second electrode of the second transistor is connected with a second power supply end; and a gate electrode of the second transistor is connected with a second signal control end;

the output circuit further comprises a third transistor; a first electrode of the third transistor is connected with a clock signal end; a second electrode of the third transistor is connected with the first electrode of the adjustable capacitor; and a gate electrode of the third transistor is connected with the first node;

the shift register unit further comprises a fourth transistor, a fifth transistor, a sixth transistor, a seventh transistor, an eighth transistor, a ninth transistor, a tenth transistor, and an eleventh transistor; a first electrode of the fourth transistor is connected with the first node, a second electrode of the fourth transistor is connected with a third voltage end, a gate electrode of the fourth transistor is connected with a frame reset signal end; a first electrode of the fifth transistor is connected with a fourth voltage end, a second electrode of the fifth transistor is connected with the second node; a first electrode of the sixth transistor is connected with the second node, a second electrode of the sixth transistor is connected with a third voltage end, a gate electrode of the sixth transistor is connected with the first node; a first electrode of the seventh transistor is connected with the first node, a second electrode of the seventh transistor is connected with the third voltage end, a gate electrode of the seventh transistor is connected with the frame reset signal end; a first electrode of the eighth transistor is connected with a gate electrode of the fifth transistor, a second electrode of the eighth transistor is connected with the third voltage end, a gate electrode of the eighth transistor is connected with the first node; a first electrode of the ninth transistor is connected with the fourth voltage end, a second electrode of the ninth transistor is connected with the first electrode of the eighth transistor, a gate electrode of the ninth transistor is connected with the fourth voltage end; a first electrode of the tenth transistor is connected with the first node, a second electrode of the tenth transistor is connected with the third signal end, a gate electrode of the tenth transistor is connected with the second node; a first electrode of the eleventh transistor is connected with the second electrode of the third transistor, a second electrode of the eleventh transistor is connected with the third voltage end, and a gate electrode of the eleventh transistor is connected with the first node.

20. A display apparatus, comprising the array substrate according to claim 1.

* * * * *